US005930892A

United States Patent [19]

Kato et al.

[11] Patent Number: 5,930,892

[45] Date of Patent: Aug. 3, 1999

[54] METHOD OF MAKING WIRE HARNESS WITH PRESS-FITTING CONTACTS

[75] Inventors: Sanae Kato; Akira Sugiyama; Kazuhiko Takada, all of Gotenba, Japan

[73] Assignee: Yasaki Corporation, Tokyo, Japan

[21] Appl. No.: 08/940,401

[22] Filed: Oct. 1, 1997

Related U.S. Application Data

[62] Division of application No. 08/395,978, Feb. 28, 1995, Pat. No. 5,709,027.

[30] Foreign Application Priority Data

| | | | |
|---|---|---|---|
| Mar. 1, 1994 | [JP] | Japan | 6-31198 |
| Feb. 2, 1995 | [JP] | Japan | 7-15744 |

[51] Int. Cl.[6] H01R 43/04; B23P 19/00; B23P 17/04

[52] U.S. Cl. 29/861; 29/825; 29/564.4; 29/749; 29/401.1

[58] Field of Search 29/364.4, 749, 29/755, 825, 861, 867, 401.1; 81/9.51

[56] References Cited

U.S. PATENT DOCUMENTS

| | | | |
|---|---|---|---|
| 3,363,309 | 1/1968 | Logan et al. | 29/867 |
| 3,895,426 | 7/1975 | Papsdorf | 29/867 |
| 4,613,319 | 9/1986 | Nagano | 474/80 |
| 4,646,404 | 3/1987 | Matsui | 29/33 |
| 4,734,965 | 4/1988 | Schaefer | 29/33 M |
| 4,860,427 | 8/1989 | Kawaguchi | 29/564.4 |

FOREIGN PATENT DOCUMENTS 60-14780 1/1985 Japan .

*Primary Examiner*—P. W. Echols
*Attorney, Agent, or Firm*—Armstrong, Westerman, Hattori, McLeland & Naughton

[57] ABSTRACT

An apparatus and method for making harnesses containing press-inserted contacts is disclosed in which connectors of the concerned type can be automatically connected to one or more other connectors by wires of the same or of varying lengths and wherein connectors of diverse forms and various layouts can be utilized. A plurality of tables adapted to carry wire-receiving connectors are arranged to be selectively relatively movable with respect to each other, including movement in a transverse direction. Wire is supplied to the connectors by selectively operable wire metering rollers and press-insertion blades associated with the respective tables operate to press-insert the supplied wires for electrical contact with the respective connectors. The present invention contemplates utilization of a wire stripping machine and/or a continuity test jig in the disclose operation and apparatus.

2 Claims, 25 Drawing Sheets

METHOD OF MAKING WIRE HARNESS WITH PRESS-FITTING CONTACTS

This is a divisional of now allowed application Ser. No. 08/395,978, filed Feb. 28, 1995 now U.S. Pat. No. 5,709, 027.

FIELD OF THE INVENTION

The present invention relates to a method of making a variety of types of harness wire with different wire lengths between connectors and an apparatus therefor.

PRIOR ART

FIG. 32 shows a prior art wire harness having press-fit contacts disclosed in Japanese Patent Preliminary Publication No. 60-14780. A guide 62 guides a plurality of parallel wires 61 therethrough. A chuck 63 holds the forward ends of the wires 61. The chuck 63 is carried on a carrying chain 64 which moves the chuck 63 back and forth. The wires 61 are cut by a cutter 65. A pressing punch 67 and pressing die 68 press the plurality of wires 61 simultaneously into intimate contact with press-fit terminals in a connector 66. A retaining cylinder 69 holds the rear end portion of the wires 61.

The plurality of wires are cut at forward ends thereof for aligned tip ends. Then, the wires advance so that the forward ends of the wires 61 are pressed into intimate contact with terminals of the connector $\mathbf{66}_1$. Then, the chain 64 drives the connector $\mathbf{66}_1$ to advance forwardly so that a second connector $\mathbf{66}_2$ is subsequently connected to the middle of the wires 61 as shown in FIG. 33, and then similarly with regard to a third connector $\mathbf{66}_3$. Then, the chain 64 further drives the connector $\mathbf{66}_1$ and the wires 61 are cut at the rear end of the connector $\mathbf{66}_3$. The aforementioned prior art apparatus 60 allows the connection of a plurality of connectors 66 in series along the length of the wires 61 as shown in FIG. 33. However, the apparatus is of no use when connecting different connectors $\mathbf{2}_1$–$\mathbf{2}_2$ or $\mathbf{2}_1'$–$\mathbf{2}_3'$ at arbitrary positions along the lenth of wires connected to a connector 3 or 3' in such a way that each connector is connected to a desired number of wires of different lengths. The apparatus is also not capable of manufacturing a wire harness as shown in FIG. 34C where a further connector $\mathbf{3}_2$ is connected to wires 13 connected to a connector $\mathbf{2}_5$, which in turn is connected to some of the wires connected to a connector $\mathbf{3}_1$. Wires $\mathbf{13}_1$–$\mathbf{13}_4$ must be manually press-fitted to the respective connectors in order to manufacture the harness wires as shown in FIGS. 34A–34C.

SUMMARY OF THE INVENTION

An object of the invention is to provide a method of manufacturing a wire harness with press-fit contacts where a plurality of connectors may be connected to one or more other connectors via wires of different lengths by automatically press-fitting the wires to the contacts of the connectors, as well as having wires connected to connectors in a variety of forms of layout.

A basic construction of an apparatus for making a wire harness with press-inserted contacts according to the invention comprises:

a pair of tables including a first table and a second table which are aligned in a path in which wires are advanced, the first table being disposed upstream of the second table, each of the tables being adapted to support at least one connector thereon, and at least one of the tables being adapted to move transversely of the path;

a first press-insertion blade and a second press-insertion blade, each of the press-insertion blades has at least one blade and is adapted to advance onto each of the tables to press-insert the wires for electrical contact with the connector supported on the table, the press-insertion blades being adapted to move transversely of the path;

a pair of wire-metering rollers adapted to move toward each other to hold the wires therebetween and rotate to meter the wires, the rollers being adapted to move away from each other to allow the wires to pass therebetween, at least one of the rollers being adapted to move transversely of the path;

a wire-supplying head adapted to retractably move between the pair of tables, the head supplying the wires to the connector on the table.

In addition to the aforementioned basic construction, the present invention provides a first construction in which the pair of rollers are disposed between the first and second tables. Further, the present invention uses a second construction in which the pair of rollers are disposed upstream of the first table.

In addition to the first and second constructions, a third construction is advantageous in which rollers disposed between the tables have as many circumferential flanges as there are wires, and a comb-like wire guide is further provided and adapted to move toward the wires integrally with one of the rollers to extend between wires so that each of the wires is separately guided. Also, a fourth construction is advantageous in which rollers diposed upstream of the first table have as many circumferential flanges as there are wires, and a comb-like wire guide is further provided and adapted to move toward the wires integrally with one of the rollers to extend between wires so that each of the wires is separately guided. A fifth construction is also advantageous in which a lid means is further provided to retractably extend over the comb-like wire guide. A sixth construction is advantageous in-which a comb-like wire guide having a plurality of blades is provided, the wire guide is pivotally movable onto the second table so as to guide each wire and each blade of the press insertion blade between adjacent blades of the wire guide.

A seventh construction is advantageous in-which the wire-supplying head includes a slide head urged toward the second table, the slide head having a plurality of wire-guiding through-holes each of which extends toward the second table and is formed with a wire-cutting blade at an outlet thereof, and the wire-supplying head further including a wire-holding mechanism.

An eighth construction is advantageous in-which a first continuity test jig is provided for testing continuity between the wires and connector connectedly supported on the first table, the first continuity test jig having a test head which retractably extends to the first table and having at least one probe pin, and a second continuity test jig is provided for testing continuity between the wires and connectors connected thereto unloaded from the second table.

The present invention provides a first method of making a wire harness with press-inserted contacts, comprising steps of:

(a) placing at least one first connector on a first table in a path through which wires are supplied and at least one second connector on a second table downstream of the first table in the path, at least one of the tables being adapted to move transversely of the path;

(b) advancing the wires to the second connector on the second table;

(c) press-inserting the wires into the second connector on the second table using a second press-insertion blade having at least one blade;

(d) retracting the second table transversely of the path leaving the second connector behind;

(e) advancing forwardly or rearwardly the wires by means of a pair of wire-metering rollers for metering a predetermined length of the wires;

(f) press-inserting the wires into the first connector on the first table using a first press-insertion blade having at least one blade.

Also, the present invention provides a method of making a press-insertion harness wherein the step (a) includes a step of placing a plurality of first connectors on the first table and a second connector on the second table; and the step (f) includes steps of;

(f1) press-inserting a number of wires into one of the plurality of first connectors on the first table using the first press-insertion blade;

(f2) moving the pair of wire-metering rollers together with the first press-insertion blade by a predetermined distance transversely of the path;

(f3) advancing a number of wires a predetermined distance either forwardly or rearwardly by means of the pair of rollers;

(f4) repeating steps (f1)–(f3) for each of the plurality of first connectors.

The present invention further provides a method of making a press-insertion harness in which the step (a) includes a first connector on the first table and a plurality of second connectors on the second table; and the step (c) includes steps of;

(c1) press-inserting a number of wires into one of the plurality of second connectors on the second table using the second press-insertion blade;

(c2) moving the pair of wire-metering rollers and the second press-insertion blade a predetermined distance transversely of the path;

(c3) advancing a number of wires a predetermined distance either forwardly or rearwardly by means of the pair of rollers;

(c4) repeating steps (c1)–(c3) for each of the plurality of second connectors.

The present invention further provides a method of making a press-insertion harness in which the step (a) includes a step of placing a plurality of first connectors on the first table and a plurality of second connectors on the second table; and the step (c) includes steps of;

(c1) press-inserting a number of wires into one of the plurality of second connectors on the second table using the second press-insertion blade;

(c2) moving the pair of wire-metering rollers and the second press-insertion blade a predetermined distance transversely of the path;

(c3) advancing a number of wires a predetermined distance either forwardly or rearwardly by means of the pair of rollers; and (c4) repeating steps (c1)–(c3) for each of the plurality of second connectors; and the step (f) includes steps of;

(f1) press-inserting a number of wires into one of the plurality of first connectors on the first table using the first press-insertion blade;

(f2) moving the pair of wire-metering rollers together with the first press-insertion blade by a predetermined distance transversely of the path;

(f3) advancing a number of wires a predetermined distance either forwardly or rearwardly by means of the pair of rollers; and (f4) repeating steps (f1)–(f3) for each of the plurality of first connectors.

The present invention provides a method of making a wire harness with press-inserted contacts which comprises steps of:

arranging a first table for supporting at least one first connector thereon and a second table for supporting at least one second connector thereon, the first table being disposed upstream of the second table in a path through which wires are supplied to the tables;

advancing wires to the second connector on the second table;

press-inserting the wires into the second connector on the second table using a second press-insertion blade;

retracting the second table transversely of the path leaving the second connector behind;

advancing the wires either forwardly or rearwardly by means of a pair of wire-metering rollers for metering a predetermined length of the wires;

press-inserting the wires into the first connector on the first table using a first press-insertion blade.

In addition to the aforementioned methods, the present invention provides a method in which the first press-insertion blade has a single blade, and either the first press-insertion blade or the first table moves transversely of the path so as to press-insert any one or more than one wire into any one of the second connectors.

In addition to the aforementioned methods, the present invention provides a method which further includes a step of:

offsetting a position of the first table or the first press-insertion blade by a predetermined distance equal to a distance between adjacent connectors and/or a thickness of walls of adjacent connectors abutting each other.

The present invention provides a method in which each of the second connectors has a plurality of terminal cavities aligned with a half of a cavity formed at each extremity of the aligned cavities, and the first table or the first press-insertion blade is moved by a distance between adjacent wires or a multitude of the distance between adjacent wires.

The present invention provides a method of making a press-insertion wire harness which comprises steps of:

positioning a wire-supplying head over a table on which a connector is placed;

advancing wires a predetermined distance from the wire-supplying head forwardly of the wire-supplying head by means of metering-roller means, the wire-supplying head being formed with a cutting blade at each outlet for each of the wires;

cutting the wires by moving a press-insertion blade transversely of the wires; and press-inserting the wires into the connector, whereby a press-insertion wire harness with a free end is made.

The present invention provides a method of making a wire harness with press-inserted contacts which is based on an apparatus having first and second slide bases each of which supporting a connector-supporting table thereon, the first slide base is disposed downstream of the second slide base in a path in which wires are advanced, first and second press-insertion blades each of which is adapted to advance onto a connector to press-insert the wires into the connector on each connector-supporting table, a wire-supplying head movable back and forth between the tables, and wire-metering roller means disposed upstream of the tables, comprising steps of:

setting a wire-stripping machine on the slide base for the second connector, the wire-stripping machine having an upper cutting blade and a lower cutting blade;

aligning the upper cutting blade with an adapter mounted to a ram of the second press-insertion blade, the ram being adapted to retractably advance toward the lower cutting blade;

advancing the wires between the upper and lower cutting blades past the blades by the wire-supplying head and then moving the upper cutting blade toward the lower cutting blade so that the cutting blades penetrate into insulators of the wires;

moving the wires rearwardly by the wire-metering roller means, thereby stripping the wires;

press-inserting end portions of the wires remote from the stripped portion into the connector supported on the first table by the press-insertion blades.

The present invention provides a method which further includes a step of moving the wires forwardly or rearwardly by the wire-metering roller means to meter the wires for a predetermined length.

BRIEF DESCRIPTION OF THE DRAWINGS

Features and the objects of the invention will become more apparent from the detailed description of the preferred embodiments with reference to the accompanying drawings in which.

DETAILED DESCRIPTION OF THE PREFERRED EMBODIMENTS

Operation

The wire-supplying head advances between the wire-metering rollers moved away from each other. The slide head of the wire-supplying head abuts so that the tip end portions of the wires further advance forwardly under the guide lid extending over the connector. Then, the wires are press-inserted into the connector. Then, the second table moves transversely of the wire path leaving the connector behind. This allows the wire-metering rollers to move the wires forwardly or rearwardly. The wire holding mechanism pushes to prevent rearward movement of the wires. The wires are held by the comb-like wire guide and the connector moves forwardly together with the wires. Then, the wire-supplying head advances rearwardly. The first press-insertion blade moves laterally toward a first connector on the first table together with the wire-metering rollers so as to press-insert the wires to the connector. The wire-metering rollers retract from the first connector to a second connector on the first table so as to advance the wires forwardly or rearwardly to be press-inserted to the second connector. Then, the press-insertion blade operates to press-insert the wires to the second connector. One or more than one, connector is placed on both first and second tables so that a wire harness with cross branches may be manufactured by moving the tables or the press-insertion blades independently of the other in the direction transverse to the wire path. The connectors are placed with the terminals side facing upward so that the probe pins of the continuity test jigs are inserted into the connectors from where the probe pins will not disturb the press-insertion operation.

The wires are moved rearwardly by the wire-metering rollers allowing manufacture of a harness shorter than the distance between the tables. The wire-stripping machine may be mounted in place of the second table. This arrangement permits the wire-metering rollers to move rearwardly to strip the wires, resulting in a wire harness with a free end.

Construction

Figure 1:
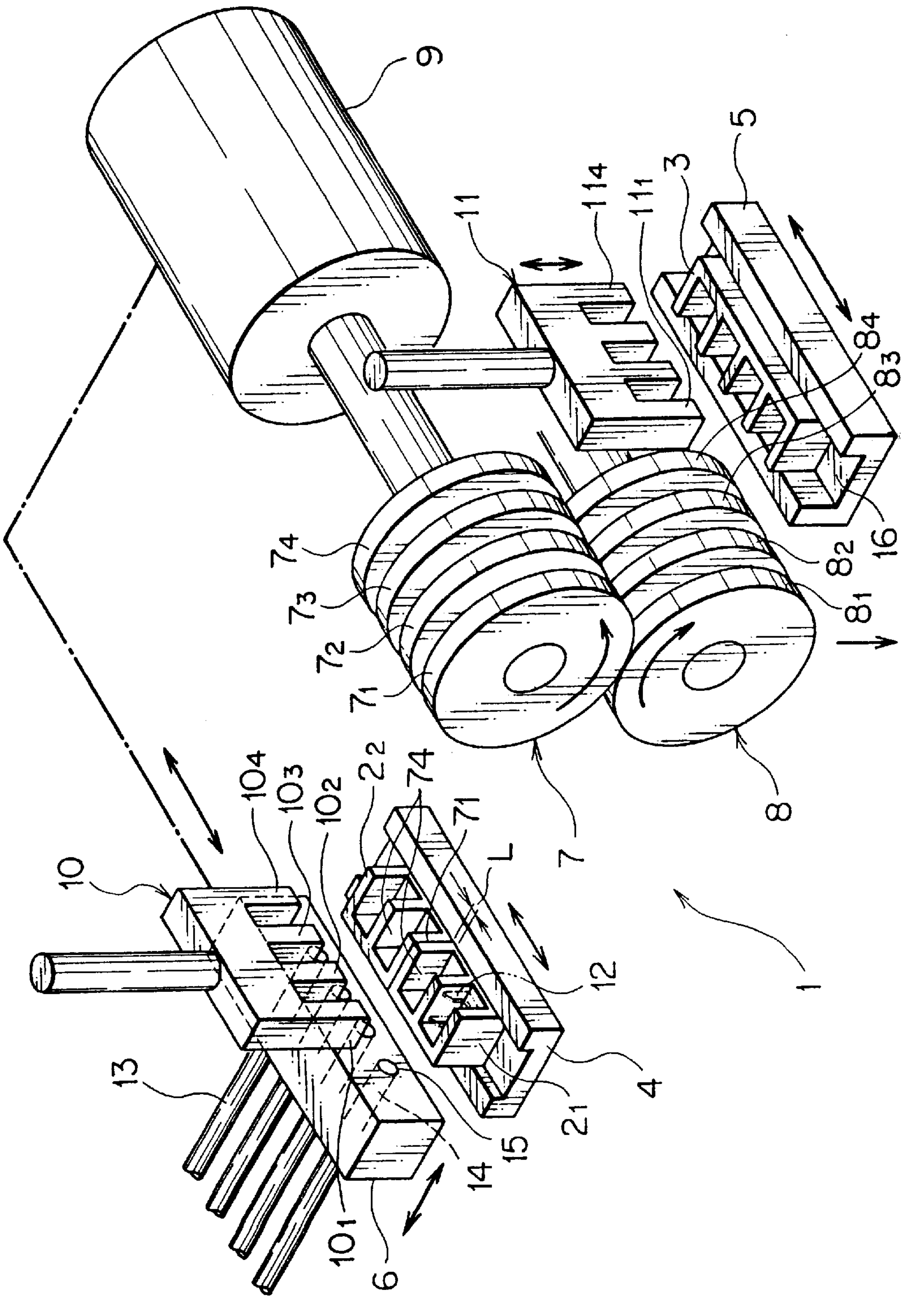
FIG. 1 shows an essential part of a first embodiment of an apparatus for making a wire harness with press-fit contacts according to the invention.
Figure 2A:
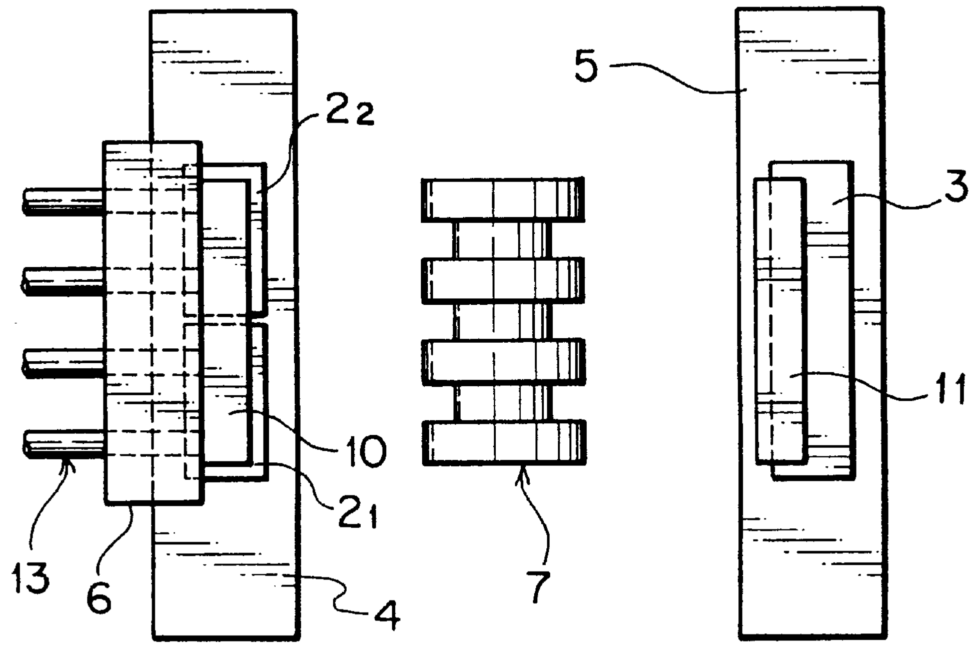
FIGS. 2A–2B show the operation of the apparatus of FIG. 1, FIG. 2A showing a top view and FIG. 2B showing a side view.
Figure 2B:
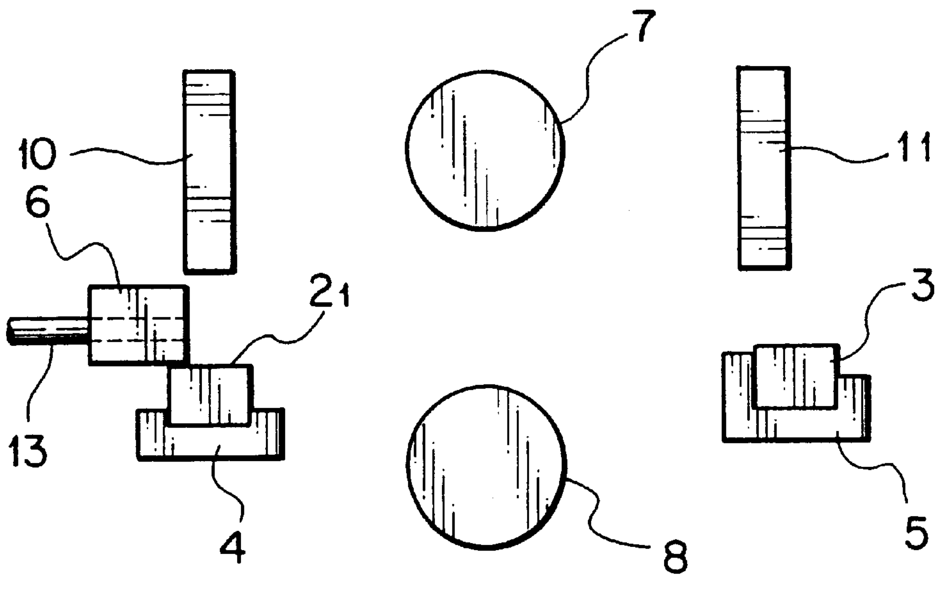

FIG. 1 shows an essential part of a first embodiment of an apparatus for making a wire harness with press-fit contacts according to the invention and FIGS. 2A–2B show the operation thereof.

The principle of the invention will first be described with respect to FIGS. 1, 2A–2B, 3A–3B, 4A–4B, 5A–5B, and 6A–6B and the detailed construction will be described aftterwards.

In FIG. 1, a pair of connector tables 4 and 5 are adapted to receive first and second short connectors $\mathbf{2}_1$ and $\mathbf{2}_2$ and a long connector 3, respectively, and to laterally move independently from each other. A wire-supplying head 6 is adapted to move from a short connectors 2 side to a long connector 3 side, and vice versa. A pair of wire-metering rollers 7 and 8 are adapted to vertically move into contact with each other and away from each other. The rollers 7 and 8 have a plurality of parallel circumferential flanges $\mathbf{7}_1$–$\mathbf{7}_4$ and $\mathbf{8}_1$–$\mathbf{8}_4$, respectively. The roller 7 engages the roller 8 to drive the roller 8 into rotation. A motor 9 drives the upper roller 7 into rotation. A press blade 10 has a plurality of blades for the short connectors 2 and is laterally movable in synchronism with the upper roller 7. A press blade 11 is provided for the long connector 3.

In this embodiment, two short connectors 2 are placed side-by-side on the table 4. The respective connectors 2 and 3 have press terminals 12, each of which is connected to external terminals, not shown, on the bottom side of the connectors.

Figure 3A:
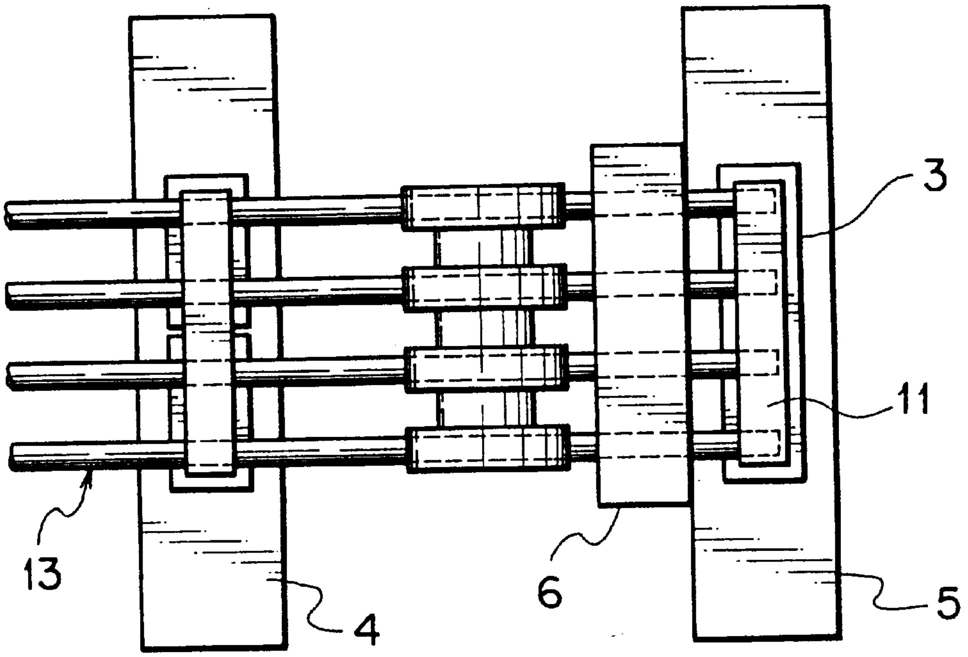
FIGS. 3A–3B show the operation of the apparatus of FIG. 1 when wires are press-inserted into a long connector, FIG. 3A showing a top view and FIG. 3B showing a side view.
Figure 3B:
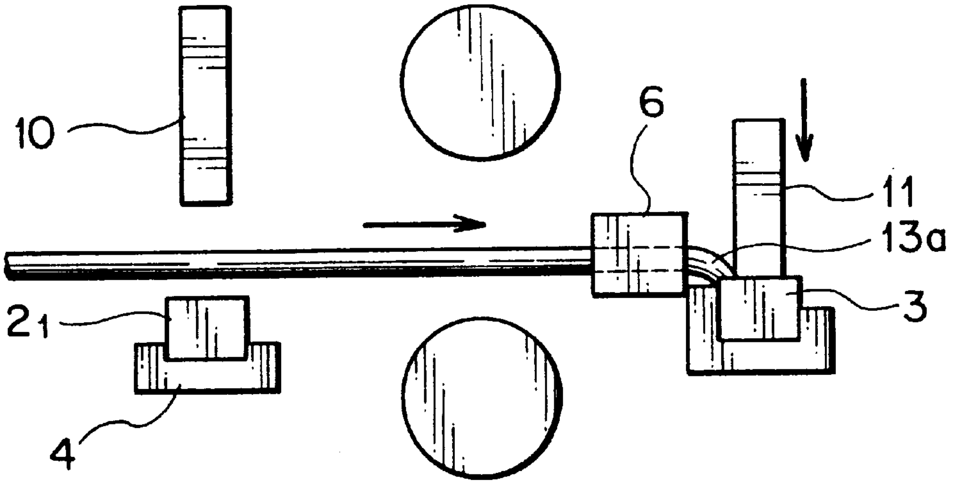

When connecting wires to the connectors, the wires 13 are aligned at the head 6, as shown in FIG. 2A. Then, the upper and lower rollers 7 and 8 move away from each other as shown in FIG. 2B so as to allow the head 6 to advance between the rollers 7 and 8 toward the long connector 3. Then, the head 6 and wires 13 move together and abut the table 5 to stop, as shown in FIG. 3A, while the wires 13 are further advanced by a later described mechanism through the head 6 to the long connector 3. The press blade 11 descends so that blades $\mathbf{11}_1$–$\mathbf{11}_4$ press-insert the wires 13 into contact with the press terminals 12 of the long connector 3, as shown in FIG. 3B.

The head 6 has a plurality of parallel holes 14 through which the wires 13 pass, and is provided with wire-cutting blades 15 at the exits of the holes 14 as shown in FIG. 1.

Figure 4A:
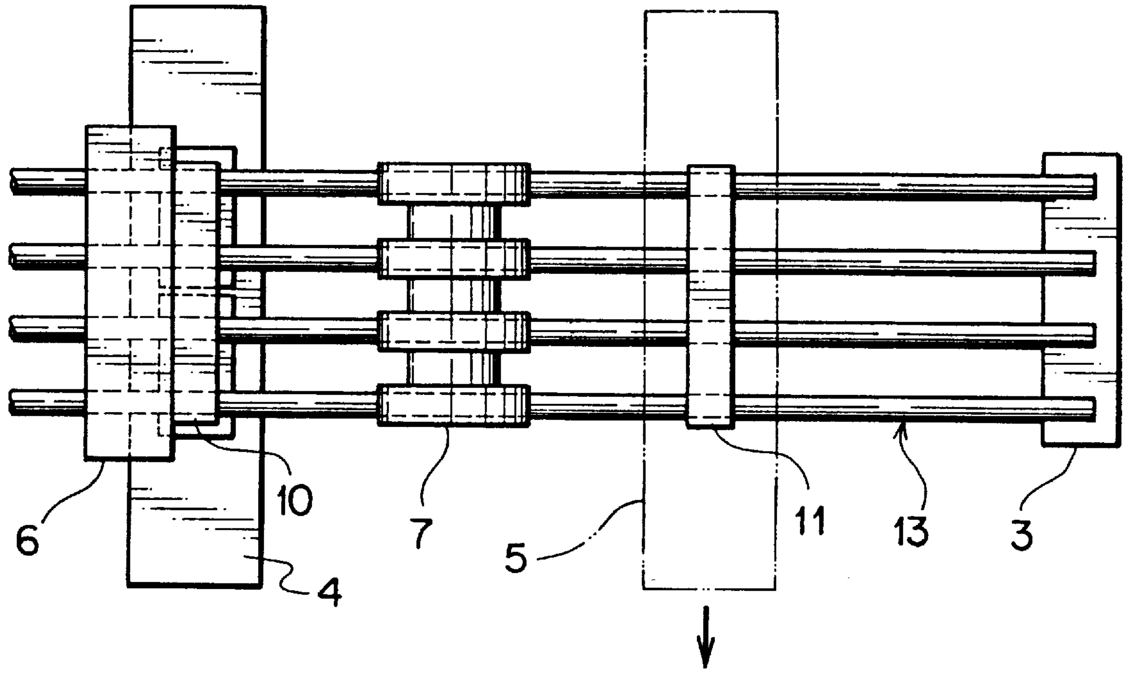
FIGS. 4A–4B show the operation of the apparatus of FIG. 1 when the wires are metered by wire-metering rollers, FIG. 4A showing a top view and FIG. 4B showing a side view.
Figure 4B:
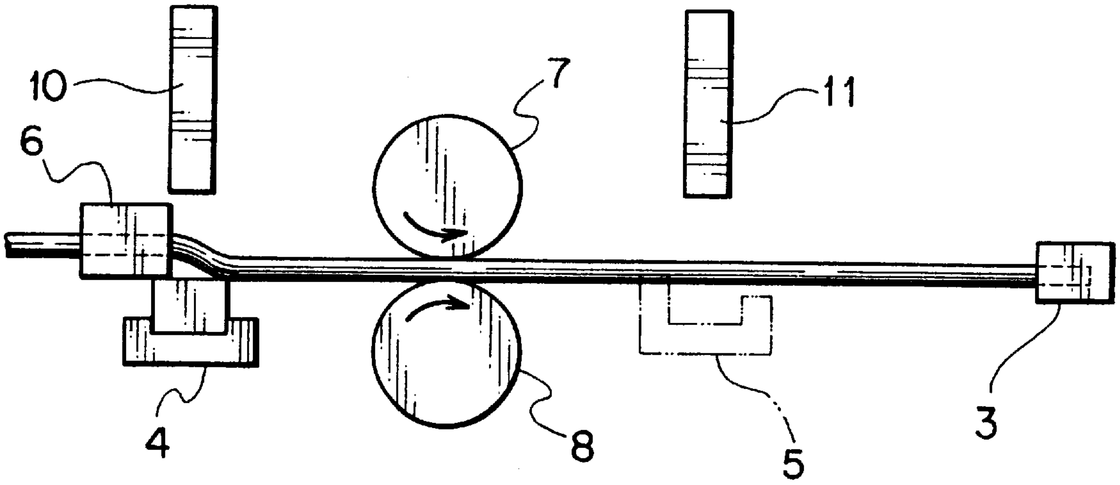
Figure 5A:
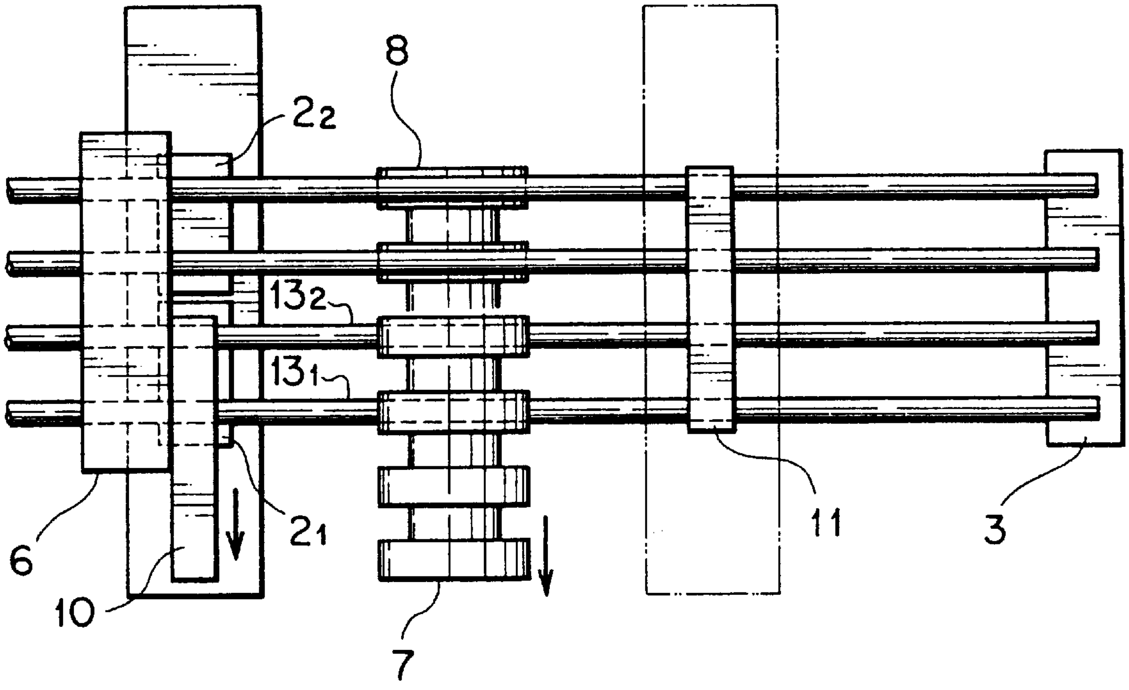
FIGS. 5A–5B show the operation of the apparatus of FIG. 1 when the wires are press-inserted into a first connector, FIG. 5A showing a top view and FIG. 5B showing a side view.
Figure 5B:
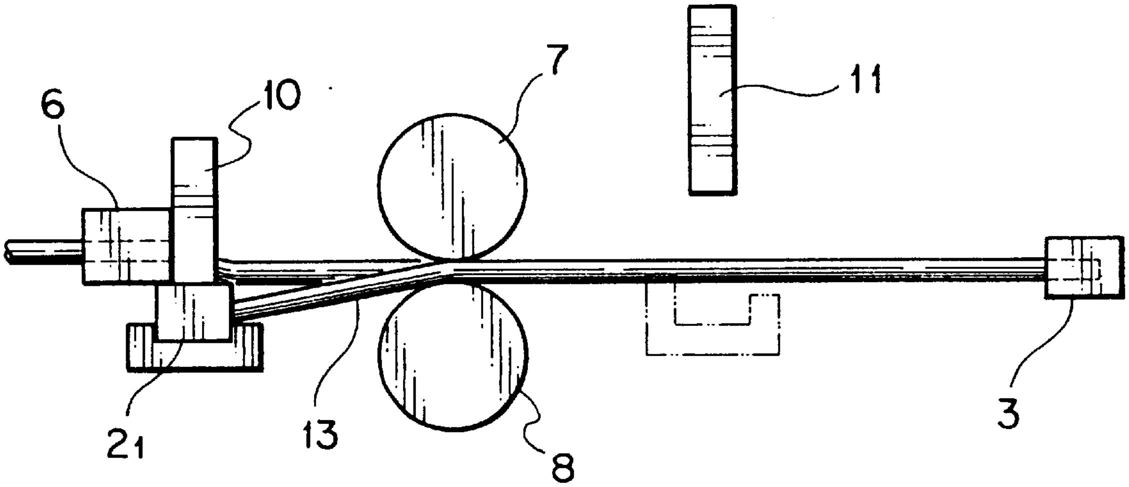
Figure 7:
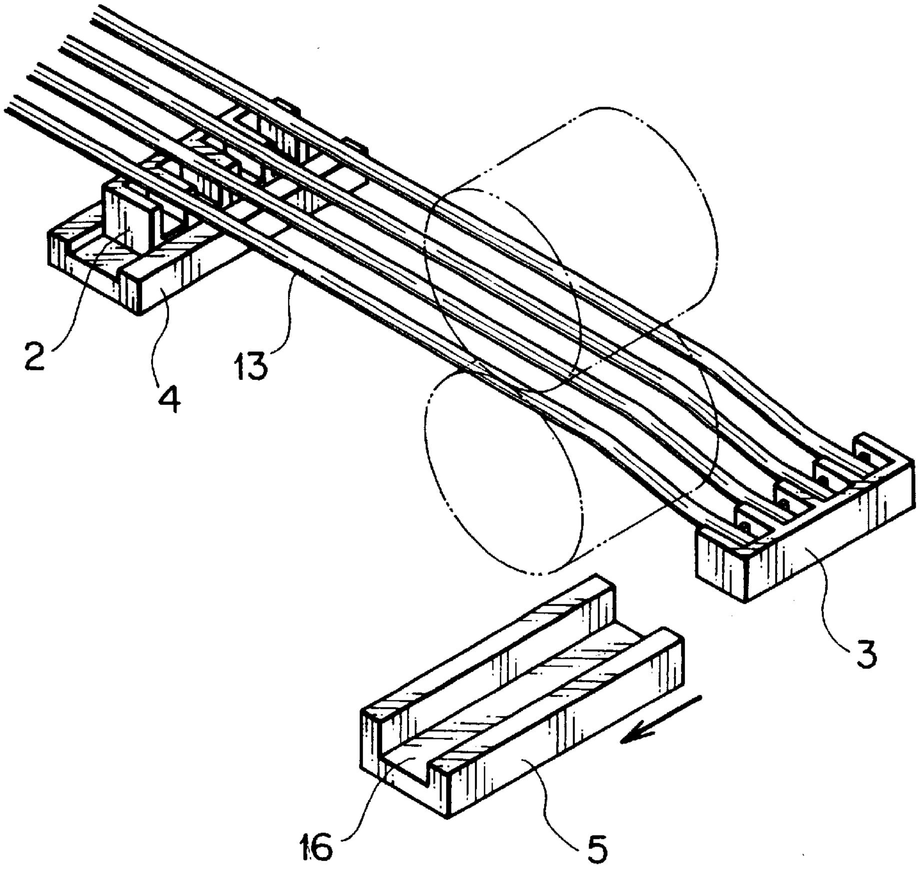
FIGS. 7 shows the operation of the apparatus of FIG. 1 when the table is retracted transversely of the wire path.

Then, the connector table 5 moves transversely of the wires in the direction of arrow, as shown in FIGS. 4A and 7, leaving the long connector 3 where it is. The rollers 7 and 8 vertically move towards each other to hold the wires therebetween and the roller 7 drives the roller 8 into rotation to advance the wires 13 by a predetermined length, as shown in FIG. 4A. Then, as shown in FIG. 5A, the press blade 10 moves toward the first short connector $\mathbf{2}_1$ together with the upper roller 7 and then the press blade 10 descends so that the wires $\mathbf{13}_1$ and $\mathbf{13}_2$ are cut by the cutting blades 15 and the blades $\mathbf{10}_3$ and $\mathbf{10}_4$ press-insert the wires $\mathbf{13}_1$–$\mathbf{13}_2$ into the first short connector $\mathbf{2}_1$. It is to be noted that the lower roller 8 is in a fixed position while the upper roller 7 moves transversely of the wires.

Figure 6A:
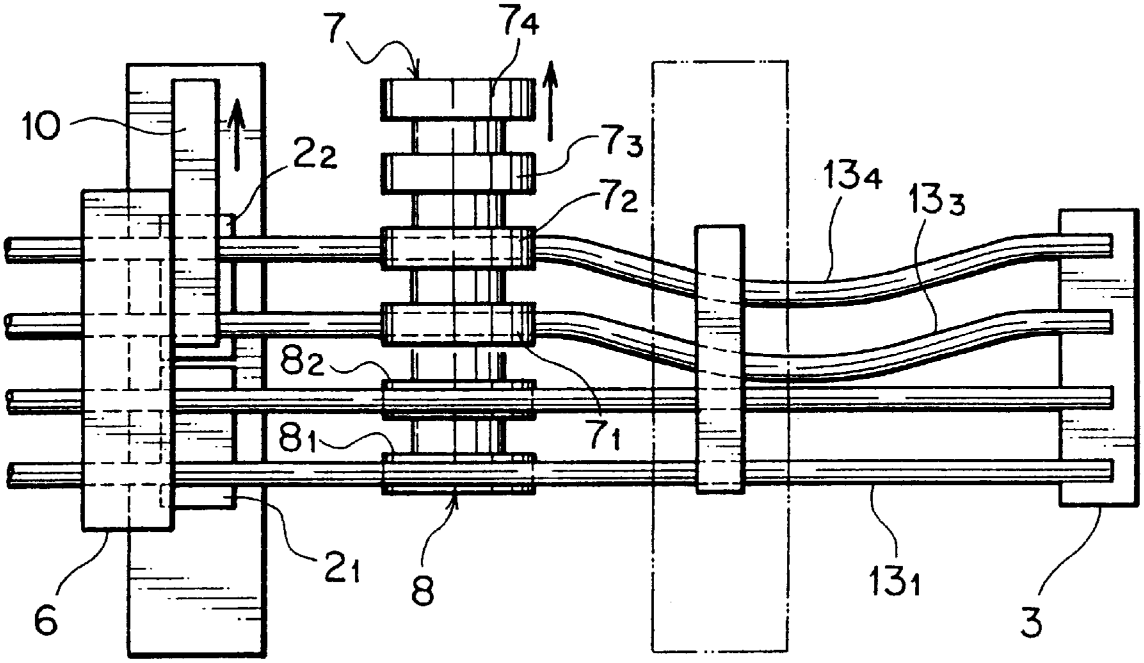
FIGS. 6A–6B show the operation of the apparatus of FIG. 1 when the wires are press-inserted into a second connector, FIG. 6A showing a top view and FIG. 6B showing a side view.
Figure 6B:
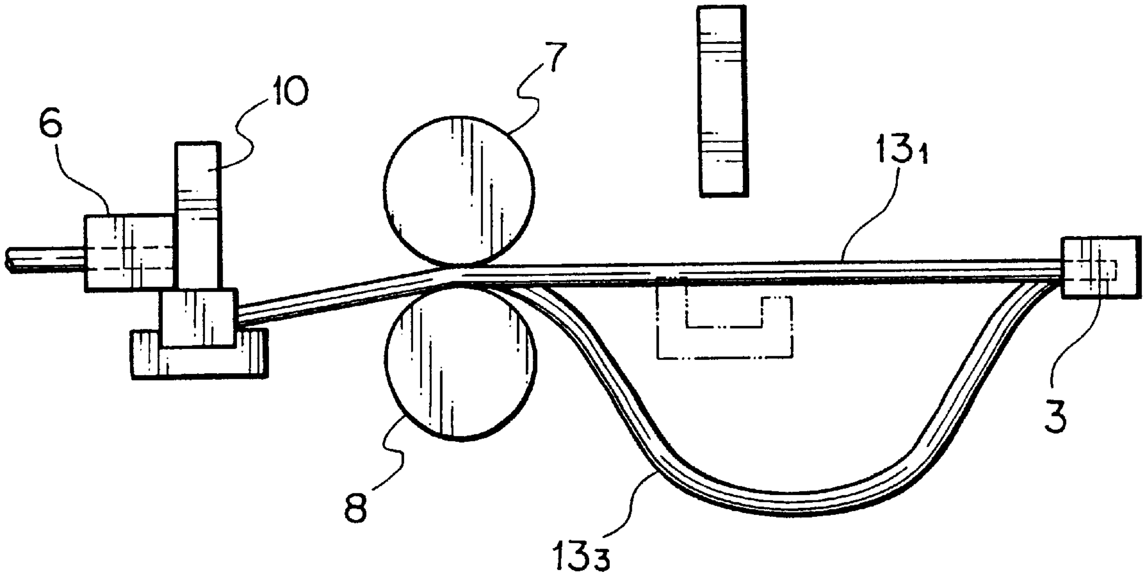

As shown in FIG. 6, the upper roller 7 vertically moves out of engagement with the lower roller 8 and is then moved, together with the press blade 10, toward the second short connector $\mathbf{2}_2$. The roller 7 again engages the roller 8 so that the circumferential flanges $\mathbf{7}_1$ and $\mathbf{7}_2$ oppose the circumferential flanges $\mathbf{8}_3$ and $\mathbf{8}_4$, respectively, to cause the wires $\mathbf{13}_3$ and $\mathbf{13}_4$ to further advance a predetermined length as shown in FIG. 6A. Thus, the wires becomes slack between the rollers and the long connector 3 as shown in FIG. 6B. The press blade 10 descends again so that the wires $\mathbf{13}_3$ and $\mathbf{13}_4$ are cut by the cutting blades 15 and then the blades $\mathbf{10}_1$ and $\mathbf{10}_2$ press-insert the wires $\mathbf{13}_3$–$\mathbf{13}_4$ into the second short connector $\mathbf{2}_2$.

Figure 34A:
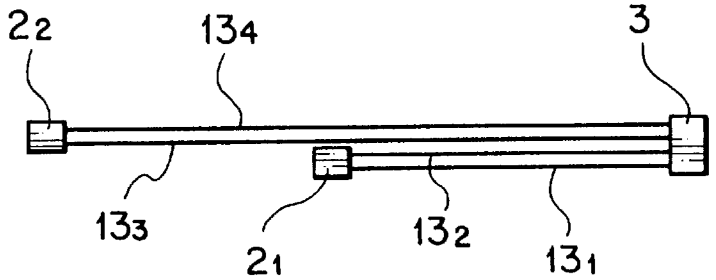
FIGS. 34A–34C show wire harness with press-inserted contacts manufactured with an apparatus according to the present invention.
Figure 34B:
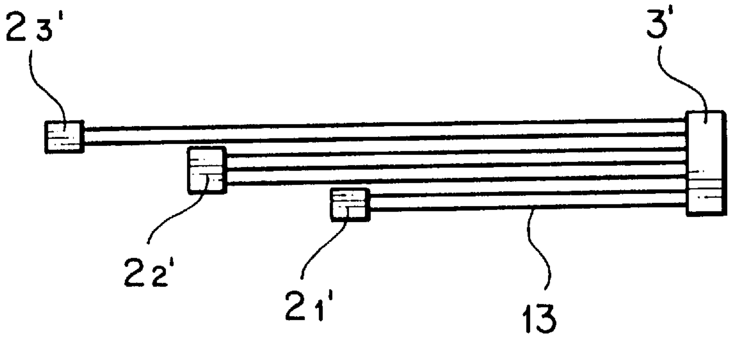
Figure 34C:
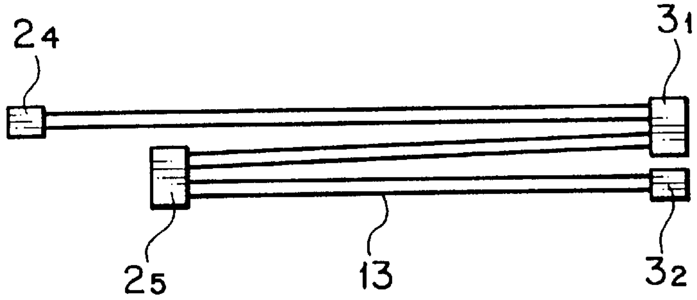

The first embodiment has been described in terms of two short connectors 2 connected to a long connector 3, as shown in FIG. 34A. Likewise, more than two short connectors may also be connected to one long connector 3 as shown in FIG. 34B by moving the roller 7 and the press blade 10 in a similar manner. Further, as shown in FIG. 34C, the wires 13 can also be connected between connectors on the first connector table 4 and those on the second connector table 5 such that the wires are connected from connector $\mathbf{2}_4$ to connector $\mathbf{3}_1$, and then from connector $\mathbf{3}_1$ to connector $\mathbf{2}_5$, and finally from connector $\mathbf{2}_5$ to connector $\mathbf{3}_2$. Providing more holes 14 in the head 6, more of the press blades 10 and 11, and more flanges on the rollers 7 and 8 permits the connection of a greater number of wires 13, thus a greater number of short connectors 2. The upper roller 7 may be moved together with the lower roller 8. The press blade 10 and the upper roller 7 may be moved laterally, each independently of the other. In FIG. 4, the table 5 may be at a fixed position and the tables 4 and 5 may be positioned so that the distance between the tables 4 and 5 is the desired length of wires between connectors 2 and 3.

In FIG. 1, the cavities 74 in the connectors $\mathbf{2}_1$ and $\mathbf{2}_2$ are not in line with cavities in the connector 3 due to the fact that the distance between the adjacent cavities is greater by "L" where the connector $\mathbf{2}_1$ contacts the connector $\mathbf{2}_2$. Therefore, the press blade 10 and the table 4 are moved by a distance "L" equal to the thickness of the wall where the connector $\mathbf{2}_1$ contacts the connector $\mathbf{2}_2$ so as to position the cavity 74 of the short connector 2 right below the wire 13. Such transverse movement of the press blade 10 and the table 4 is advantageous to make cross branches of harnesses for the short connectors $\mathbf{2}_1$ and $\mathbf{2}_2$, as shown in FIG. 10.

Figure 8:
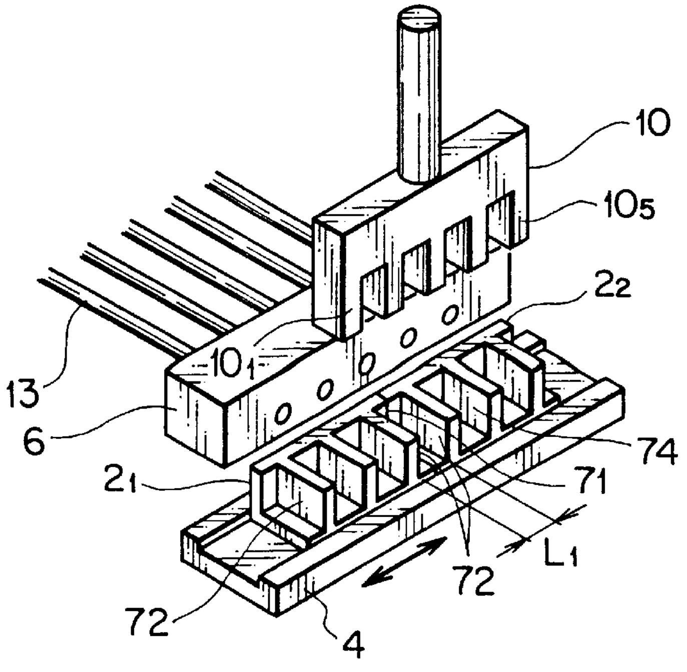
FIG. 8 shows connectors formed with a half of a cavity at extremities of aligned cavities.

Alternatively, as shown in FIG. 8, the connectors $\mathbf{2}_1$ and $\mathbf{2}_2$ each may be formed to have a half 72 of a cavity at opposed ends thereof so that the two halves make one complete "dummy" cavity when the connectors $\mathbf{2}_1$ and $\mathbf{2}_2$ are placed end to end. The "dummy" cavity formed of the two halves has a width L1 the same as other cavities. The manufacturing apparatus may be programmed to laterally move with a minimum pitch equal to the distance between adjacent wires. The blade 10 and/or the table 4 are moved n pitches so that the blade will not enter the "dummy" cavity preventing a wire from entering the dummy cavity.

Figure 9A:
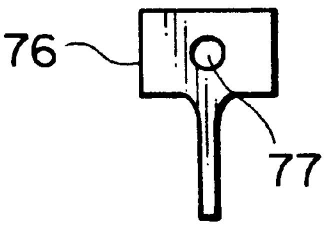
FIGS. 9A–9B illustrate a specific example of a press blade, FIG. 9B showing a press blade 75 having a plurality of blades 75 and FIG. 9A showing a press blade having a single blade 76.
Figure 9B:
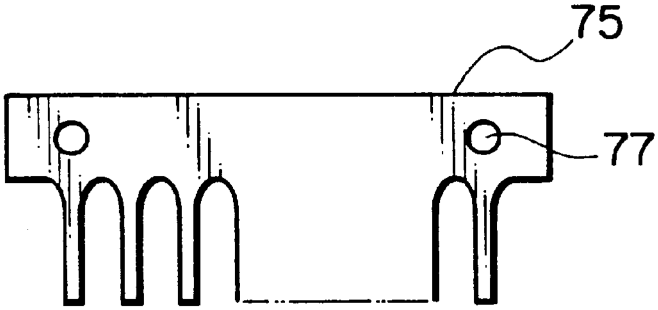

FIGS. 9A–9B illustrate a specific example of a press blade, with FIG. 9B showing a press blade 75 having a plurality of blades 75 and FIG. 9A showing a press blade having a single blade 76. The press blades 75 and 76 are secured to a later-described block 38, as shown in FIG. 11, with bolts inserted through holes 77.

Figure 10:
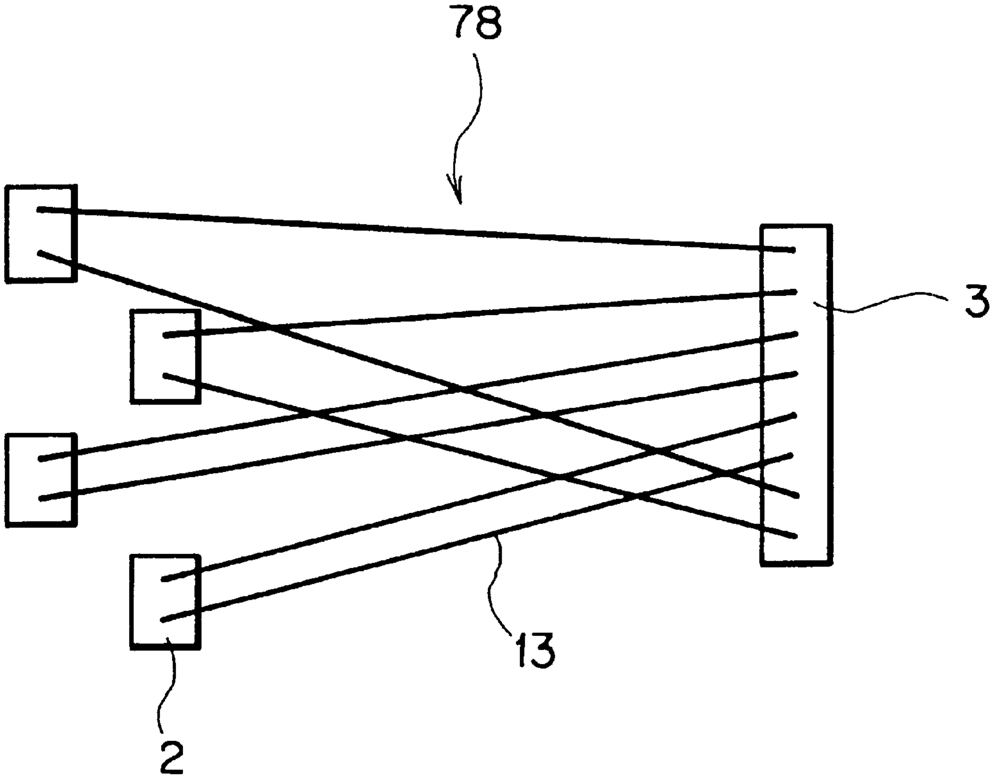
FIG. 10 shows a wire harness having cross branches of harness.
Figure 14:
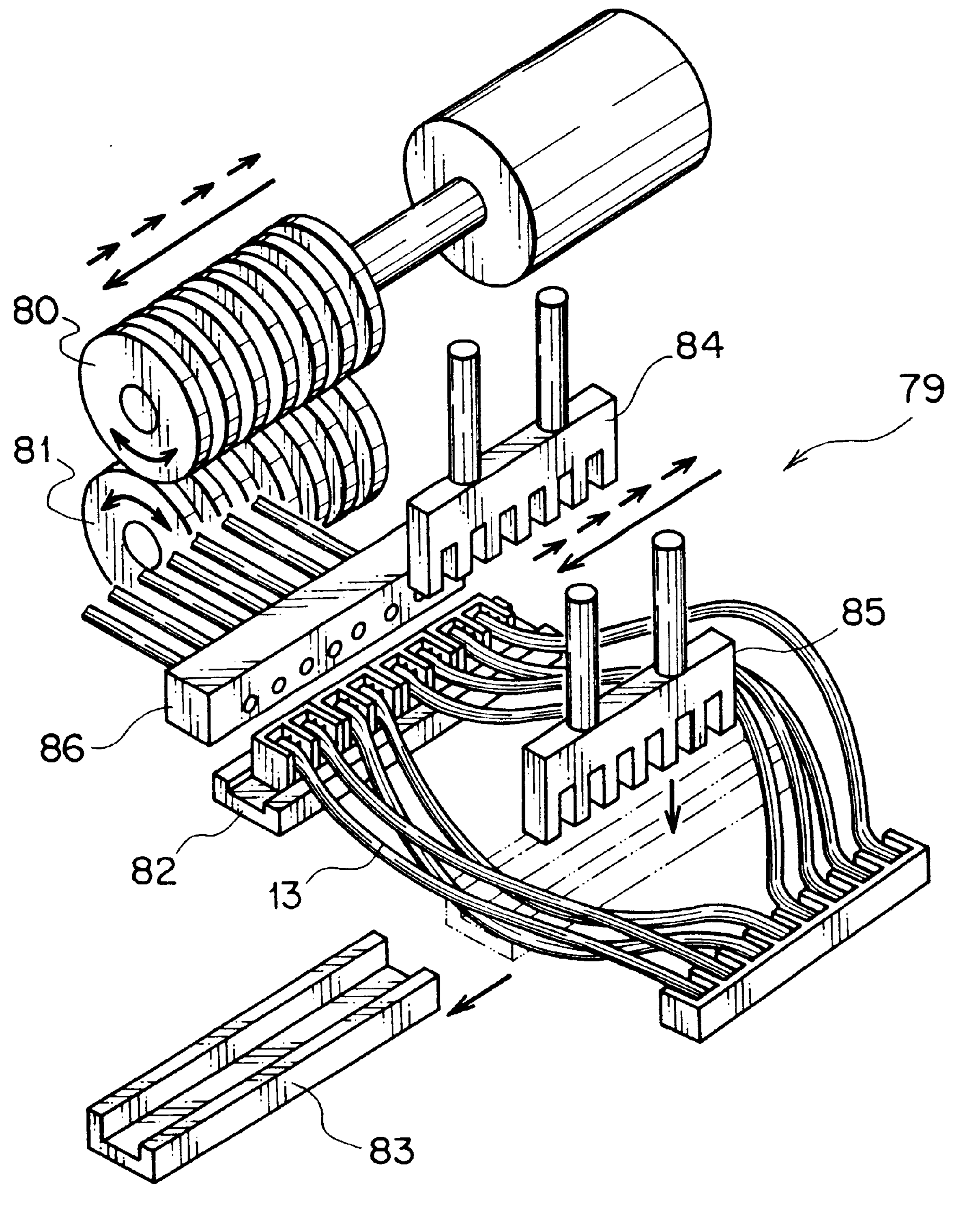
FIG. 14 shows a perspective view of the essential part of a second embodiment of an apparatus for making a wire harness with press-inserted contacts of the invention.

Forming the complex wire harness 78, as shown in FIG. 10, necessitates repeated press-insertion operations on the same wires, if the press blade 75 having a plurality of blades is to be used. Repetitive press-insertion operation on the same wires is not harmful but should be avoided. In such a case, a press blade 76 with a single blade is advantageous. The blade 76 is secured to, for example, the upper portion of the table on which a plurality of short connectors 2 is placed. Then, the table 4 or press blade 76 is moved many times back and forth transversely of the wires 13 so as to form a complex wire harness 78 having wires cross-coupled, as shown in FIG. 10. The use of the press blade 76 having a single blade is also applicable to a configuration as shown in FIG. 14 where a pair of wire-metering rollers 80 and 81 measures the length of wires before the wires are inserted into the press blade 84 and the head 86.

Figure 11:
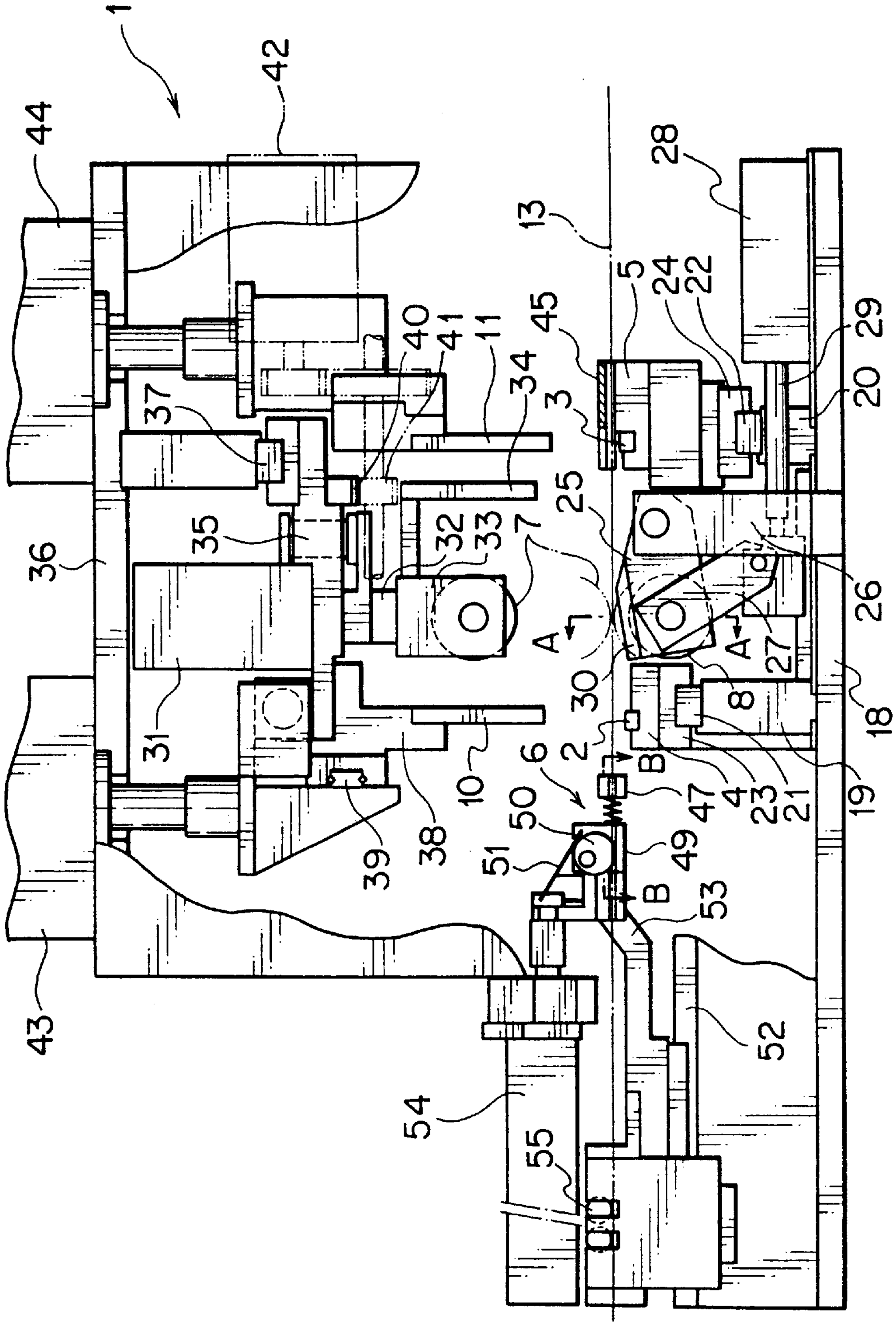
FIG. 11 shows a first embodiment of a wire harness with press-inserted contacts.

FIG. 11 illustrates a specific construction of a first embodiment of an apparatus for making a harness with press-inserted contacts of the invention.

Figure 12:
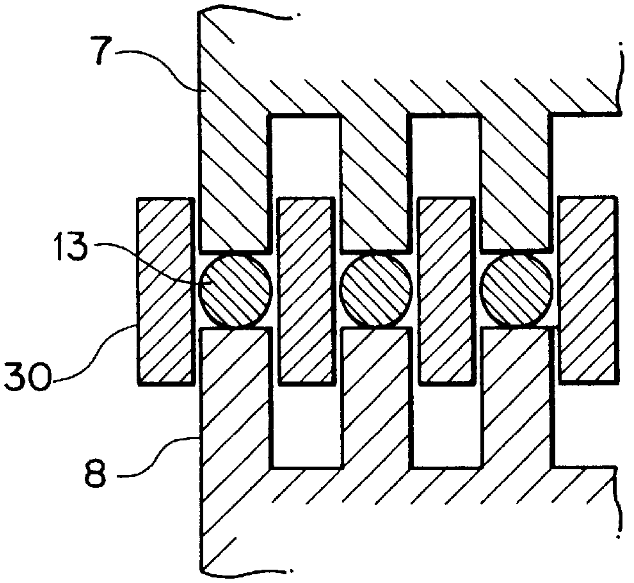
FIG. 12 shows a cross-sectional view taken along tines A—A of FIG. 11.

A pair of connector tables 4 and 5 supports the short connectors 2 and the long connector 3 thereon. The connector tables 4 and 5 are slidable one independently of the other transversely of the wires by means of rails 21 and 22 on bases 19 and 20 upright on a frame 18, and slide guides 23 and 24 on the rails 21 and 22, respectively. The rollers 7 and 8 are provided between the connector tables 4 and 5 and are adapted to vertically move into or out of contact with each other. The roller 8 is journaled to a substantially laterally extending link 25 and to a substantially vertically extending link 27. The lateral link 25 is rotatably coupled to an upright column 26 provided on the frame 18. The link 27 is rotatably coupled to a rod 29 of a cylinder 28. The cylinder 28 is fixed to the frame 18, and causes the rod 29 to extend or retract to drive link 27 so as to drive the lower roller 8 in a vertical motion. The link 25 has a comb-like wire guide 30 into which the flanges of the rollers 7 and 8 extend so that the wires 13 are properly guided therethrough as shown in FIG. 12. The wire guide 30 ascends and descends together with the lower roller 8 in an integral manner.

The upper roller 7 is rotatably supported by a bracket 33 attached to a rod 32 of a cylinder 31 and is driven by a motor, not shown. The bracket 33 has an arm 34 for laterally pushing a sub harness assembly out of the way, i.e., wires 13 which have been press-inserted. The upper roller 7 and arm 34 are adapted to laterally move together with the press blade 10. The base 35 on which the cylinder 31 is secured engages laterally slidably a rail 37 secured on a ceiling 36. The press blade 10 is secured to a block 38 separated from the base 35 and is adapted to laterally move along the rail 39.

A rack 40 fixed to the base 35 is driven into sliding motion by a motor 42 via a pinion 41. The base 35 is adapted to laterally move, together with the block 38, via an engagement means, not shown. The block 38 descends or ascends by means of a cylinder 43 fixed to the ceiling 36 independently of the base 35 so as to press-insert the wires 13 to the short connectors 2 with the press blade 10. The press blade 11 is coupled to the cylinder 44 secured to the ceiling 36 so as to press-insert the wires 13 into the short connectors 2 by means of guide plates 45 on the connector table 5.

Figure 13:
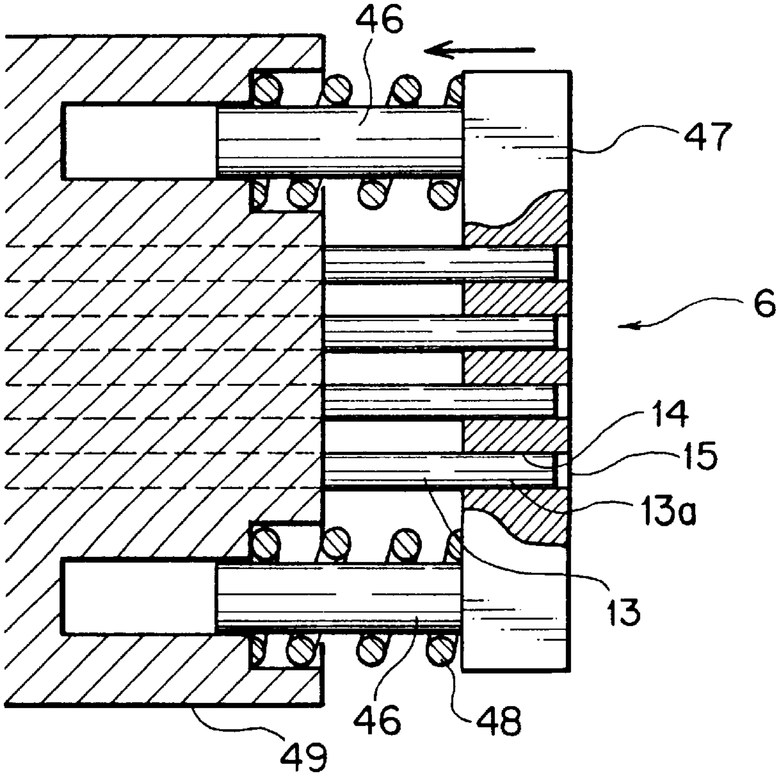
FIG. 13 shows a cross-sectional view taken along lines B—B of FIG. 11.

The head 6 advances forwardly toward the connector table 5. The head 6 includes a slide head 47 having a pair of guide bars 46 and 46 each of which is mounted to a coil spring 48 thereon as shown in FIG. 13. The slide head 47 is adapted to move toward a head body 49 against the coil spring 48. The head body 49 and slide head 47 are formed with a plurality of parallel holes 14 therethrough through which the wires 13 pass via guide rollers 55. The outlet of the hole 14 also serves as the wire-cutting blade 15. The slide head 47 abuts the connector table 5 and then slides back to slide head body 49, thereby the wires 13 project over the long connector 3 where the tip ends 13*a* of the wires are press-inserted into the long connector 3 by the press blade 11.

The head body 49 has as many cams 50 as there are wires, which cams serve as a wire holding mechanism that prevents the wires from moving backward. The head body 49 also includes a leaf spring 51 that urges the cams 50 against the wires 13. The head 6 slidably engages rail 52 on the frame 18 through an arm 53 and is coupled to the cylinder 54 which drives the head into motion back and forth.

FIG. 14 is an illustrative perspective view of a second embodiment of an apparatus for making a wire harness with press-inserted contacts of the invention.

The apparatus 79 differs from the first embodiment in that the upper and lower roller 80 and 81 are disposed behind the first connector table 82 rather than between the connector tables. This arrangement is very advantageous in that the wires 13 advanced forwardly may be retracted in the opposite direction. The rollers 80 and 81, the tables 82 and 83, and press blade 84 are adapted to move transversely of the wires, and the rollers 80 and 81 and press blades 84 and 85 are adapted to more vertically with respect thereto.

Figure 15:
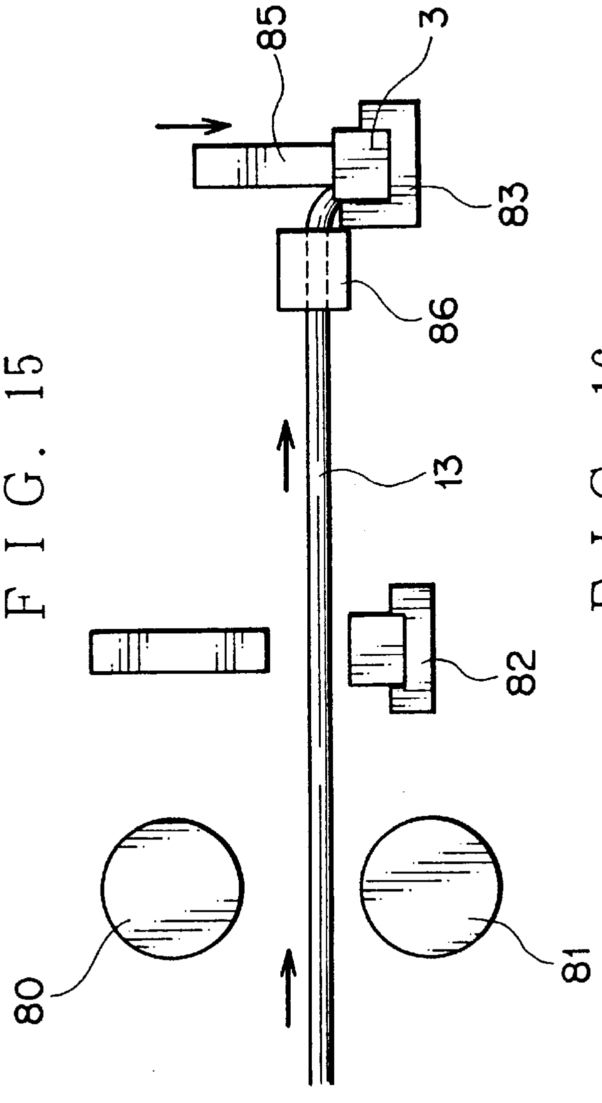
FIGS. 15 shows the operation of the apparatus of FIG. 14 when the wires are press-inserted into the second connector.
Figure 16:
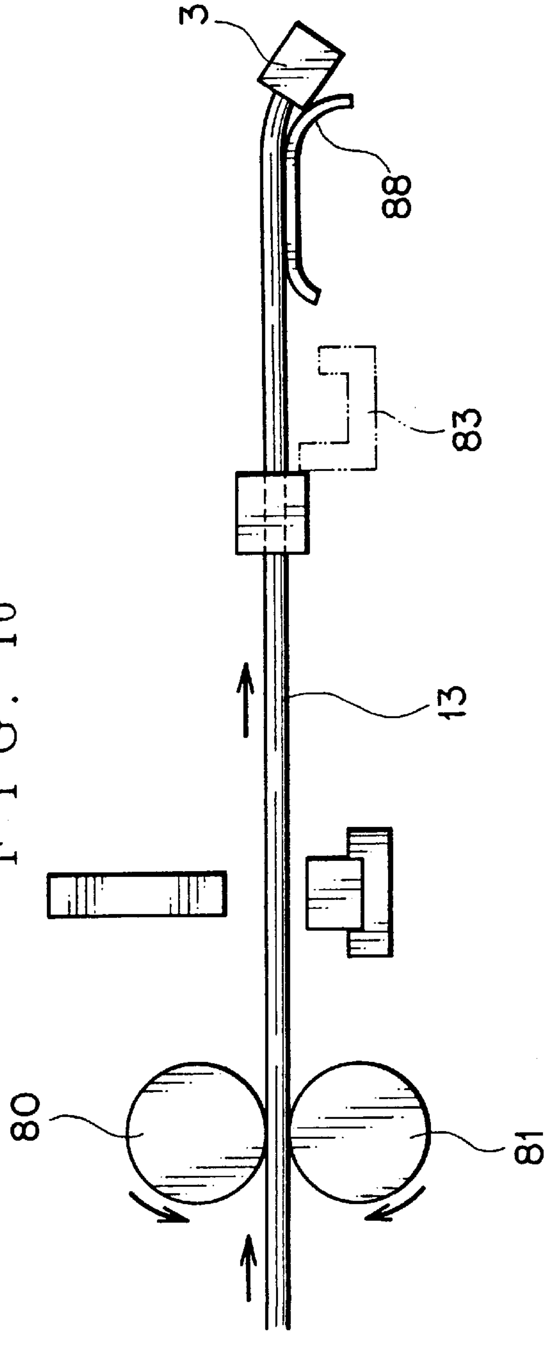
FIG. 16 shows the operation of the apparatus of FIG. 14 when the wires are forwardly advanced by the wire-metering rollers.
Figure 17:
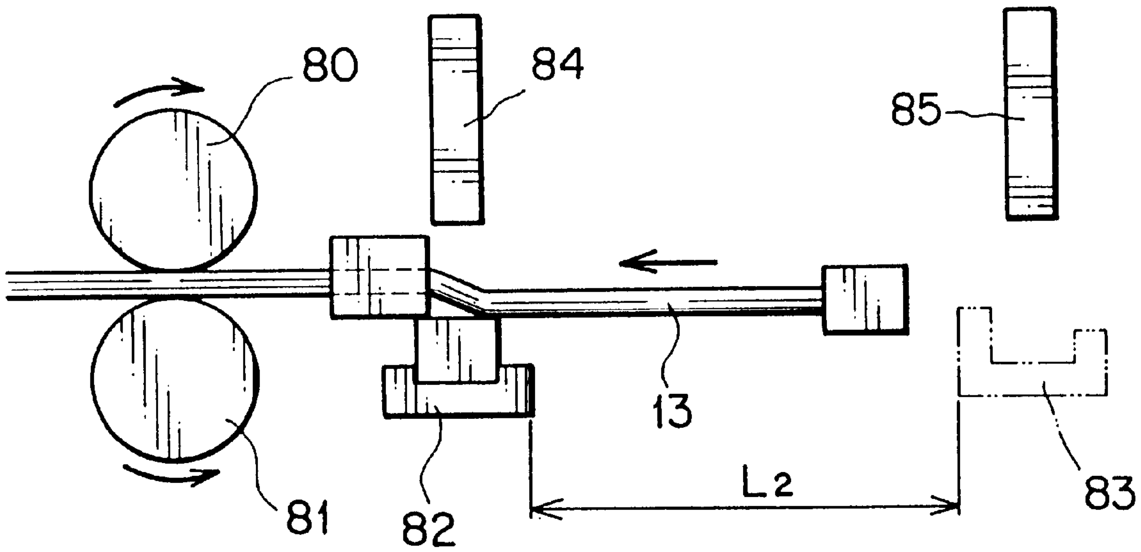
FIG. 17 shows the operation of the apparatus of FIG. 14 when the wires are rearwardly advanced by wire-metering rollers.
Figure 18:
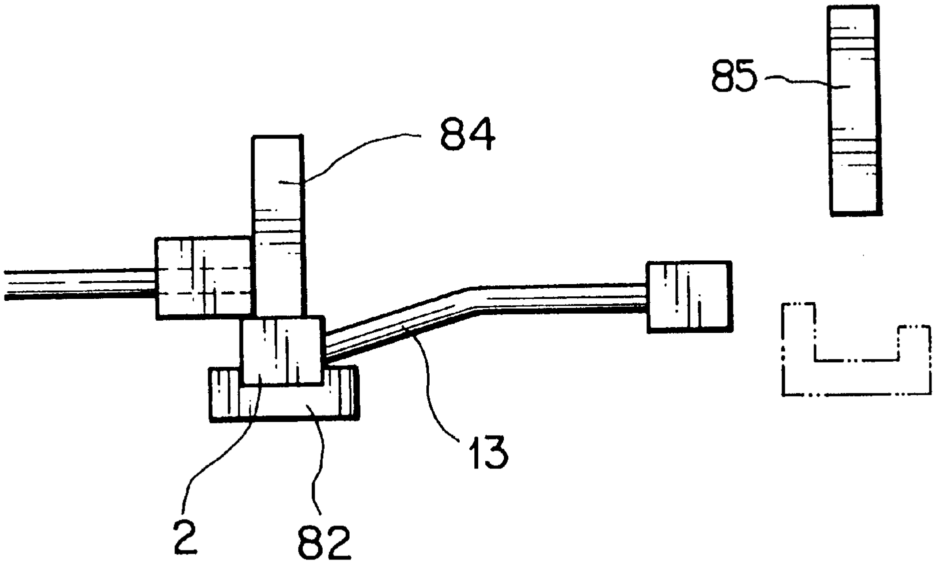
FIG. 18 shows the operation of the apparatus of FIG. 14 when a short wire harness is manufactured.

FIGS. 15–18 illustrate a method of making a wire harness with press-inserted contacts by using the apparatus 79. As shown in FIG. 15, a later-described head 86 is advanced forwardly to deliver the wires 13 to the second connector table 83. The press-insertion blade 85 descends so that the wires 13 are force fitted into electrical connection with the connector 3. Then, as shown in FIG. 16, the second table 83 is laterally retracted from the wires and then the pair of rollers 80 and 81 hold the wires in a sandwiched relation to forwardly advance the wires, thereby metering the wires in an additive manner. The long connector 3 and the wires connected thereto overlie a later-described wire guide 88 having a curved surface. The wire guide 88 guides the wires so that the connector 3 is not caught by the edge of the table 83 when the wires are moved rearwardly. The connector 3 may be either a single long connector or a plurality of short connectors. In this embodiment, the rotation of the rollers 80 and 81 may be reversed so that the wires 13 are moved rearwardly as shown in FIG. 17, after they have been connected to the connector 3 or after the connector 3 has been advanced to the position in FIG. 16. Reverse rotation of the rollers 80 and 81 offers desired lengths of wires shorter than L2 a distance between the first and the second tables, theoretically zero meters.

Thus, for example, one of two short connectors may be connected to wires longer than the distance L2 and the other to wires shorter than the distance L2. Finally, the press insertion blade 84 descends onto the first table 82 to press fit the wires to the connector 2. The rest of the operation is the same as the first embodiment.

Figure 19:
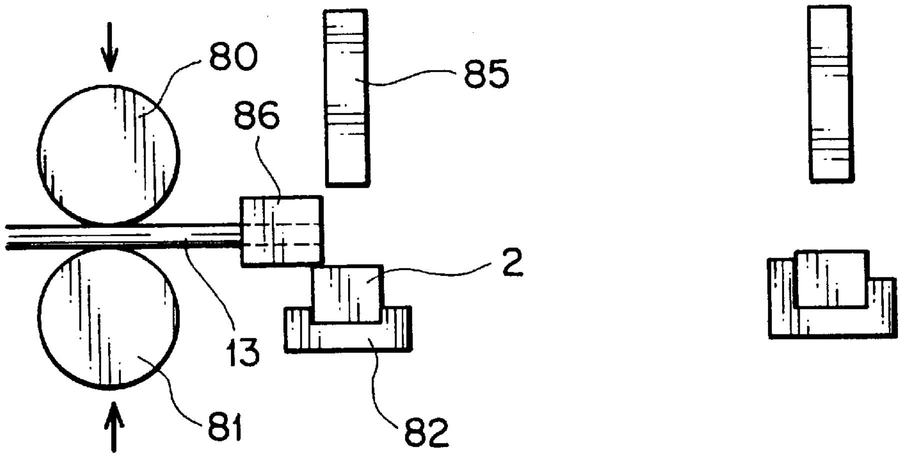
FIGS. 19–21 show the operation of the apparatus of FIG. 14 when a wire harness with a free end is produced, FIG. 19 showing an initial setting of the wires, FIG. 20 showing the wires advanced by the wire-metering rollers, and FIG. 21 showing the harness when one ends of the wires are press-inserted into a connector.
Figure 20:
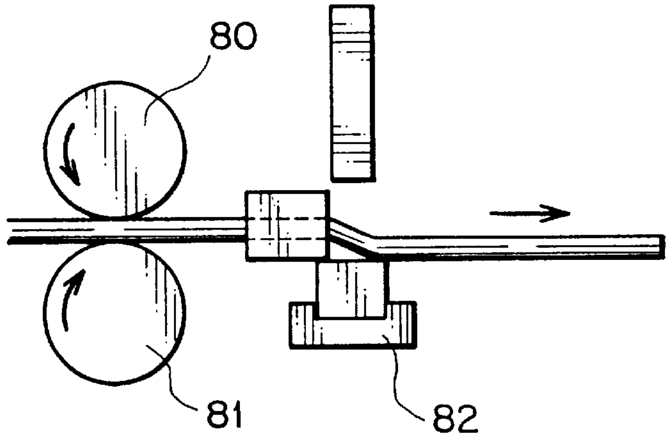
Figure 21:
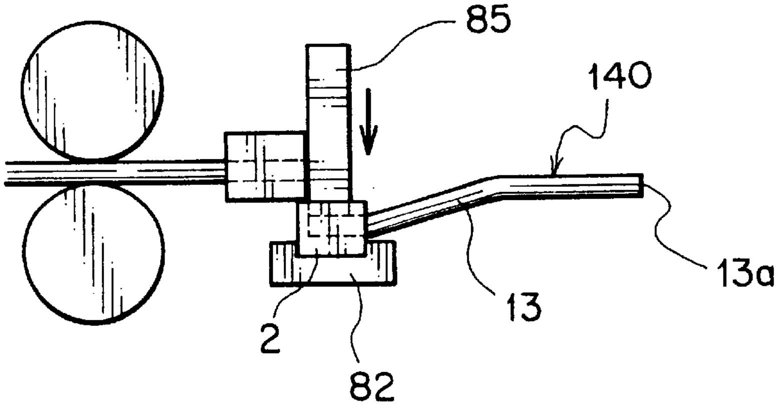

FIGS. 19–21 show other modes of operation. In the figures, the wires 13 are not advanced by moving the head 86. The connector 2 is supplied to the first table 82 as shown in FIG. 19 and the rollers 80 and 81 hold the wires 13 in a sandwiched relation. Then, as shown in FIG. 20, the rollers 80 and 81 rotate to advance the wires 13 a predetermined length. Then, the press insertion blade 84 descends onto the table 82 to force fit the wires into electrical connection with the connector 2, as shown in FIG. 21. The ends of the wires

13 are left as they are, thereby forming a harness wire 140 with free wires ends.

Figure 22:
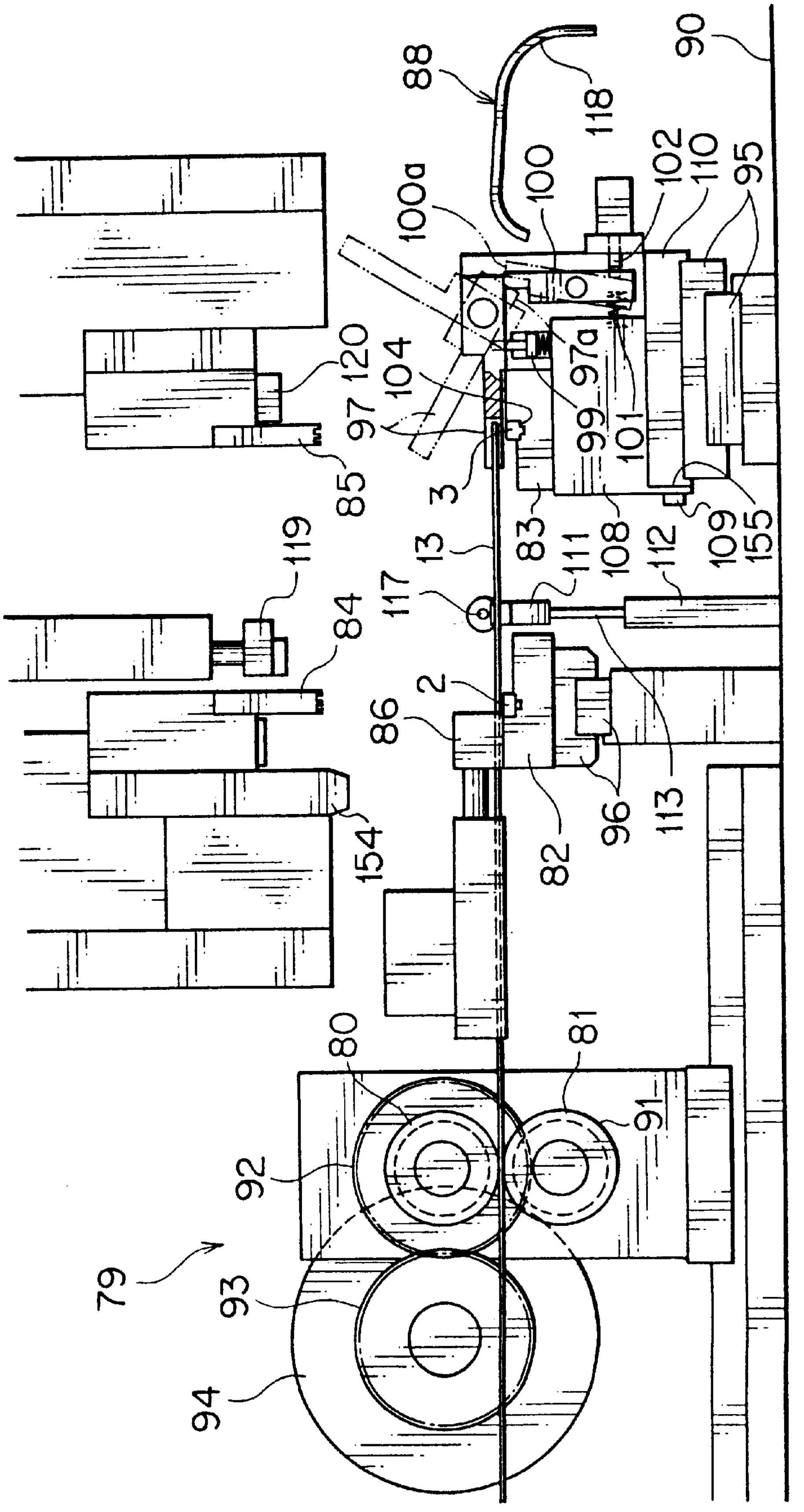
FIG. 22 shows a specific construction of second embodiment of FIG. 14.

FIG. 22 illustrates a specific construction of a second embodiment of an apparatus for malting a wire harness with press-inserted contacts.

A pair of connector tables 82 and 83 are arranged on a base 90. A pair of rollers 80 and 81 are disposed before the first table 82. Each of the rollers 80 and 81 has circumferential flanges 91 similar to those of the first embodiment. The upper roller 80 is driven to descend and ascend by a motor 94 through a reduction gears 92 and 93.

Figure 23:
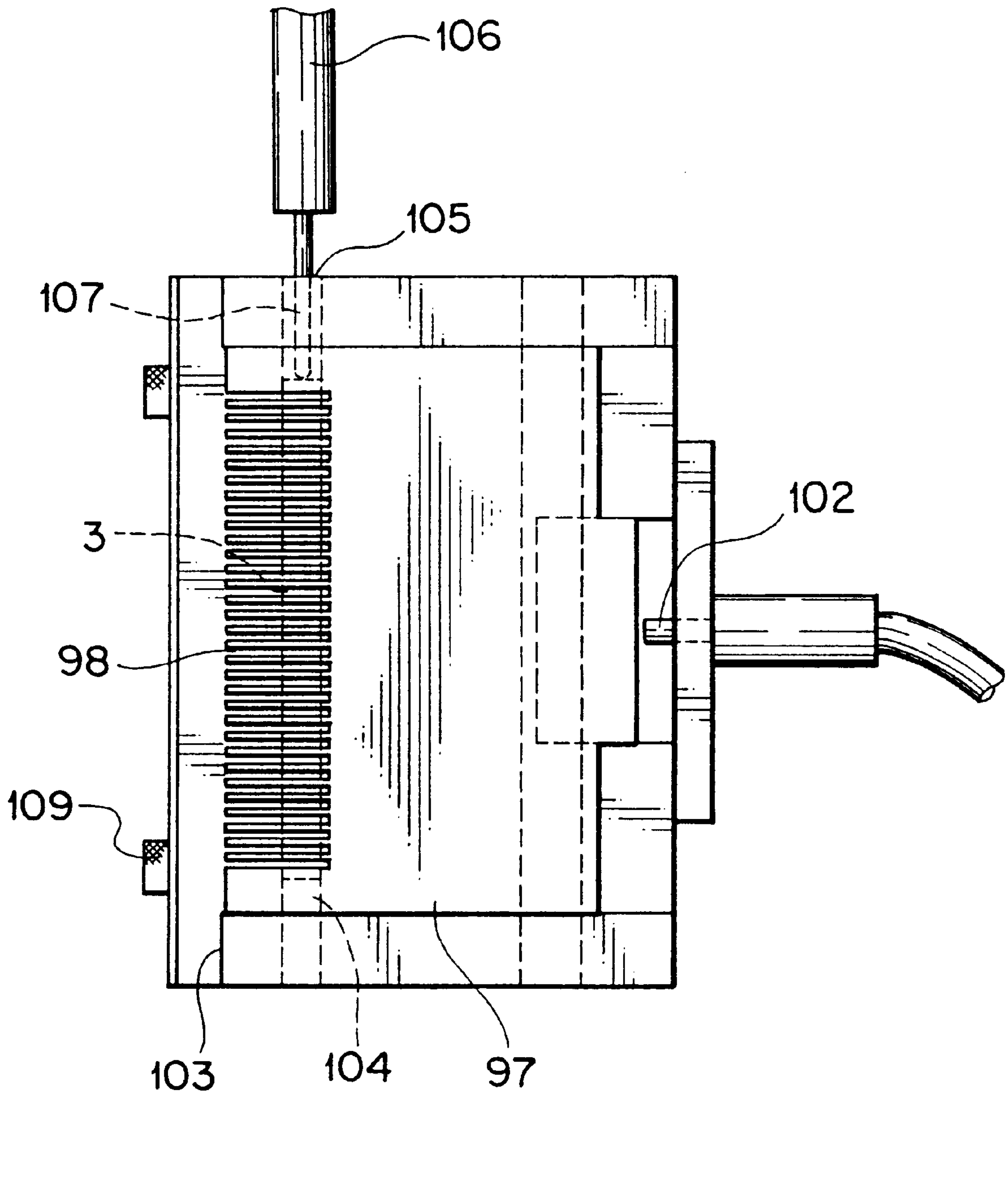
FIG. 23 shows a lid to be placed on the second tables

The tables 82 and 83 are adapted to move transversely of the wires by means of LM guides 95 and 96 or ball thread. In the figure, the first table 82 supports a wire-supplying head 86 adapted to move forwardly and rearwardly by means of a cylinder, not shown, and the second table 83 supports a guide lid 97 journaled thereto and adapted to open and close. FIG. 23 is a front view of the guide lid 97. The guide lid 97 has a plurality of comb-like slits at the forward end portion thereof through which wires are passed. The slits ensure press insertion of the wires 13 into the connector 3 without positional errors. A spring 99 urges the guide lid 97 to open while a tip 100*a* of a lock link 100 abuts a rear bottom 97*a* of the guide lid 97 to close the guide lid 97. The lock link 100 is urged by a spring 101 in such a direction as to close the lid 97, and is driven by a cylinder pin 102 to open. The guide lid 97 may be used for the first embodiment.

With references to FIGS. 22 and 23, the head 86 is advanced toward the guide lid 97 and abuts a stopper 103 where the wires 13 in slits 98 are press-inserted by a press insertion blade 85 into electrical connection with the connector 3 in a laterally extending connector receiving groove 104. One end of the groove 104 is closed and the other end is open so that a rod pin 107 of a cylinder 106 advances into the groove 104 to position the connector 3 in place. In FIG. 22, the second table 83 is integral with a block 108. The block 108 second table 83 is detachably mounted to a slider base 110 for the LM guide 95 by inserting two bolts 109 into cutout hole, not shown, in a fixed plate 155. This arrangement allows quick and easy replacement of table 83 together with the block 108 by other jigs in accordance with the types of connectors.

Figure 24:
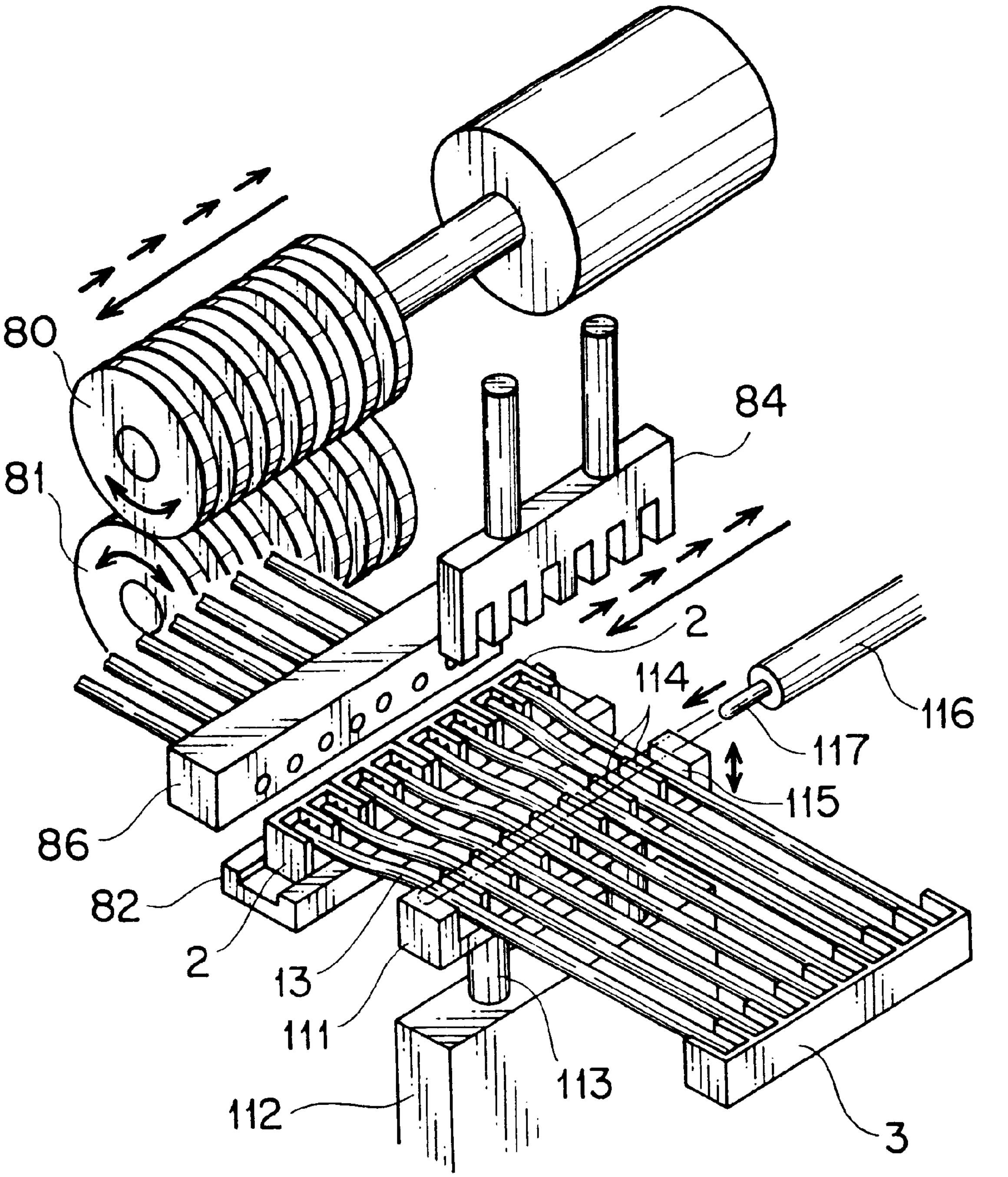
FIG. 24 is a perspective view of the essential part of the second embodiment when a wire guide is provided.
Figure 25:
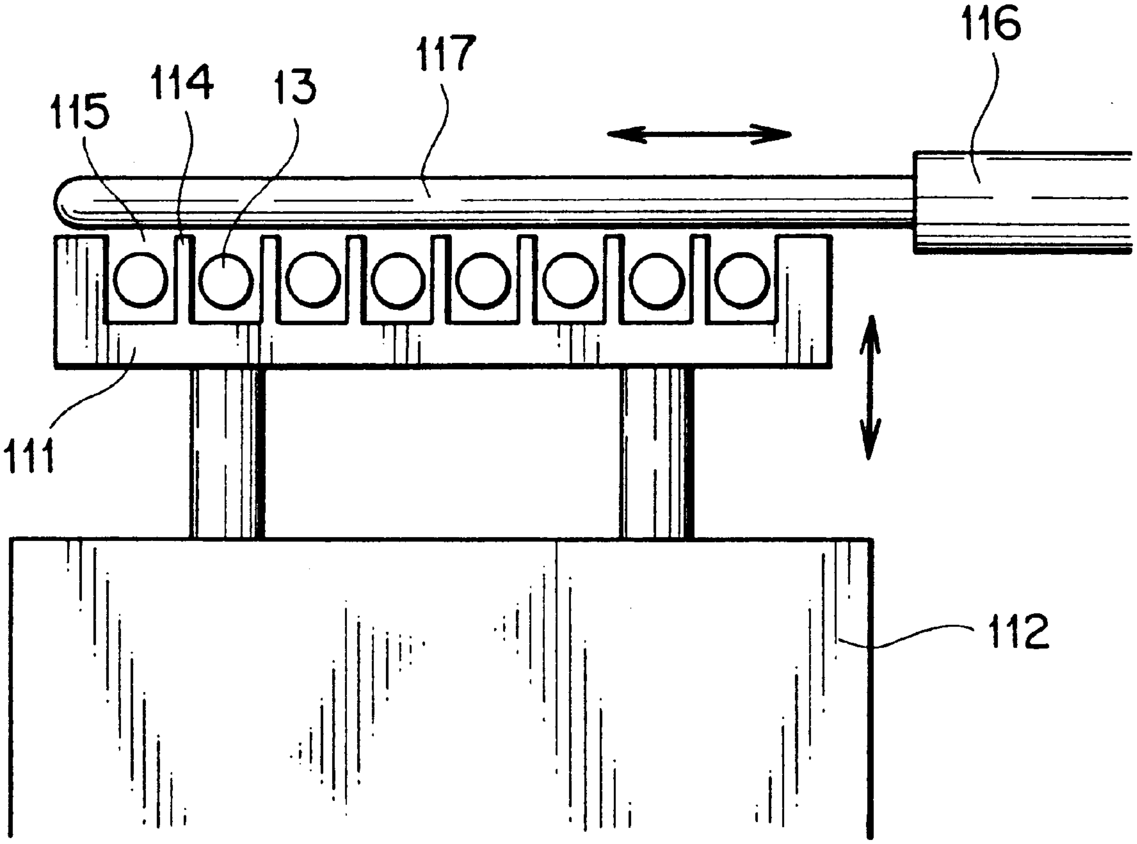
FIG. 25 is a front view of the wire guide of FIG. 24.

In FIG. 22, a wire guide 111 is disposed near the first table 82 between the tables 82 and 83. As shown in FIGS. 24 and 25, the wire guide 111 is coupled to the tip end portion of a rod 113 of a cylinder 112 so as to move up and down. The wire guide 111 supports the wires 13 passing through the slits 115 so as to hold the wires 13 horizontally with respect to the connector 2 on the table 82, so that the press-insertion blade 84 press inserts the wires accurately. As shown in FIG. 25, a retractable retaining pin 117 is driven by a cylinder 116 to extend over the slits to serve as a lid preventing the wires 13 from coming out of the slits. A retractable lid, not shown, may be used in place of the retaining pin 117. The pin 117 effectively prevents the wires from rising when the wires are moved rearwardly to meter the wires in a subtractive manner. The wire guide 111 is moved downward when the head 86 advances toward the second table 83.

In FIG. 22, a radiused substantially U-shaped wire guide 88 is disposed forwardly of and in the proximity to the second table 83. The guide 88 has a large downward curve 118 that prevents the connector connected to the wires from being caught when the wires are advanced rearwardly. Reference numeral 119 is a wire retainer and 120 a stopper.

Figure 26:
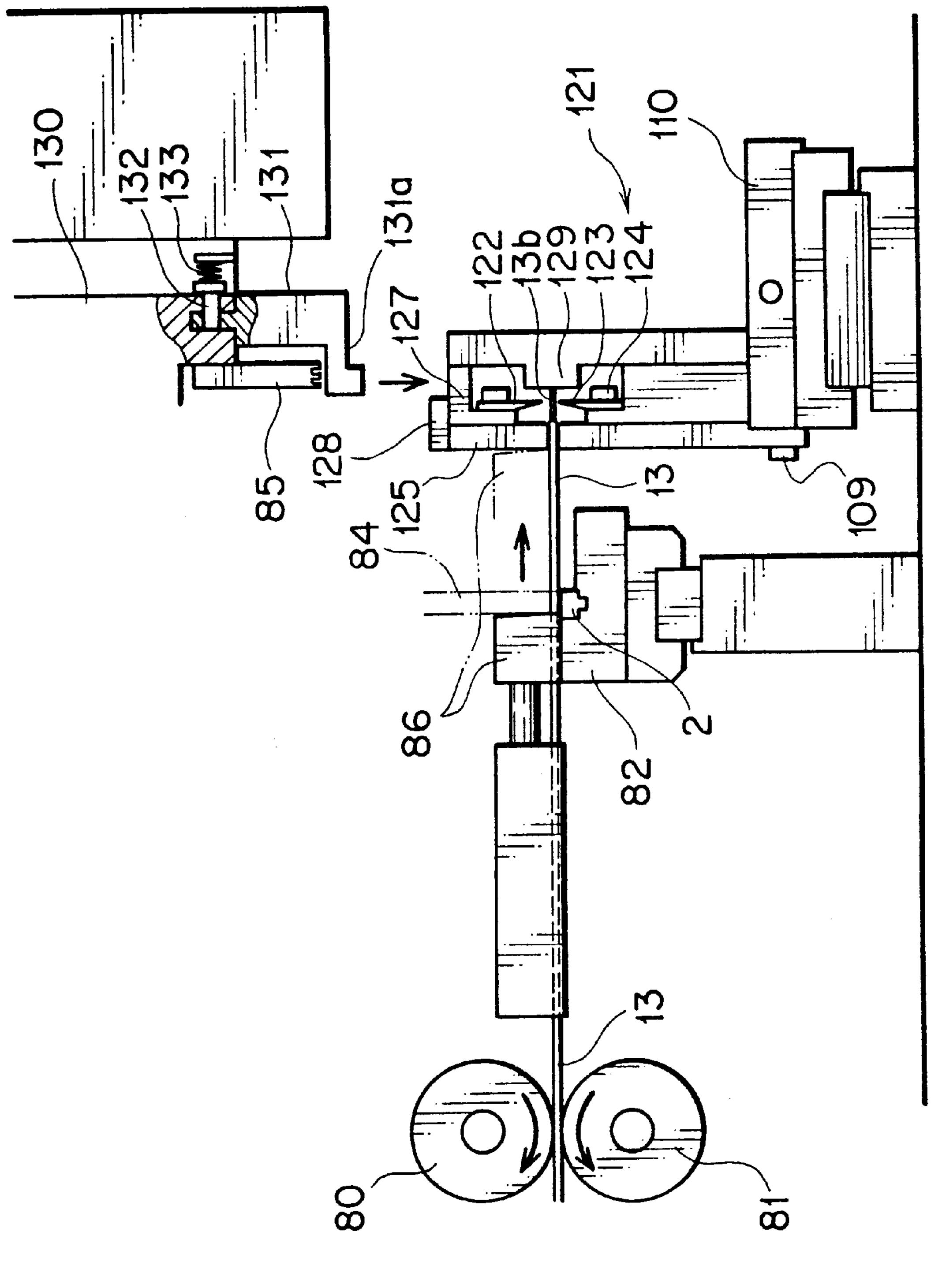
FIG. 26 is a side view of a second embodiment when a wire stripping machine is provided.
Figure 27:
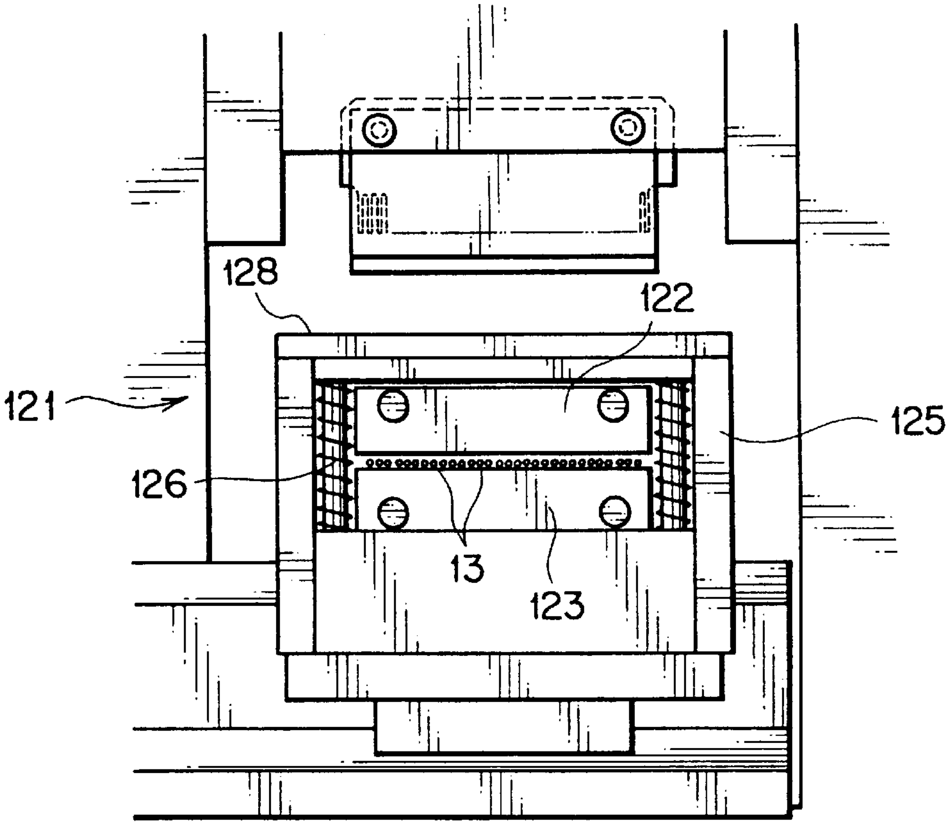
FIG. 27 is a front view of the wire-stripping machine.

FIGS. 26–27 illustrates the apparatus 79 of FIG. 22 with the second table 83 replaced by a wire stripper 121. The wire stripper 121 is secured to the slide base 110 by means of bolts 109. The wire stripper 121 has plate-like upper and lower cutters 122 and 123. The lower cutter 123 is fixed to a frame 125 by means of bolts 124 while the upper cutter 122 is secured to a slider 127 which is upwardly urged by a spring 126 between the frames 125 and is adapted to vertically move. The slider 127 is limited in its upward movement by a stopper 128. The head 86 passes over the first table 82 to abut the frame 125, so that the tip end portions 13*a* of parallel wires 13 advance between the cutters 122 and 123 until the wires abut a stopper 129 projecting from the middle of the frame 125, thus defining the length of the wires to be stripped. Then, an upper ram (block) 130 descends so that an adapter 131 attached to the tip end portion of the ram depresses the slider 127. Thus, the upper cutter 122 descends until step 131*a* of the adapter 131 abuts the frame 125 to be stopped, leaving a clearance between the upper and lower cutters 122 and 123. The clearance is equal to a diameter of the conductor portion of the wire 13. Thus, the upper and lower cutters cut the wire's insulator, and thereafter the rollers 80 and 81 hold the wires 13 to move the wires rearwardly and metering the wires in a subtractive manner, the cutters stripping the wires.

Figure 28A:
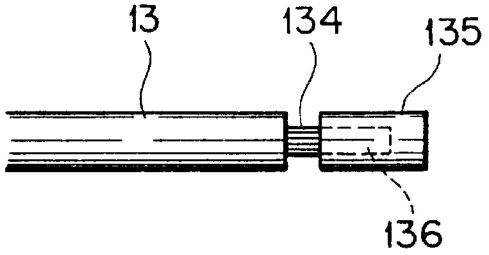
FIG. 28A shows a wire stripped in part with a piece of insulator still on the conductor.
Figure 28B:
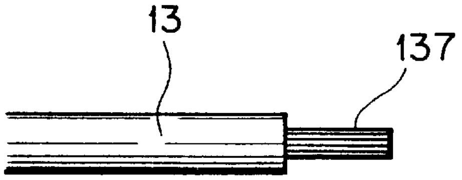
FIG. 28B shows a fully wire with a piece of insulator completely off the conductor.

The adapter 131 is fixed to the tip end portion 132 of the ram 130, projecting downwardly below the press insertion blade 84. The rollers 80 and 81 may be operated to rearwardly move the wires by about two millimeter in order to form a semi-stripped wire 134 as shown in FIG. 28A. This is advantageous in that the insulator 135 may be temporarily left on the wire for preventing the stranded wire end from fraying and is removed at a later stage. The rollers 80 and 81 are operated to further rearwardly advance the wires in order to make fully stripped wire 137, as shown in FIG. 28B. Following the stripping of the wires, the press insertion blade 84 descends onto the connector 2 on the first table 82 to press insert the wires into the connector for electrical connection as shown in FIG. 26, thereby forming a harness 140 with free wire ends of FIG. 21.

Figure 29:
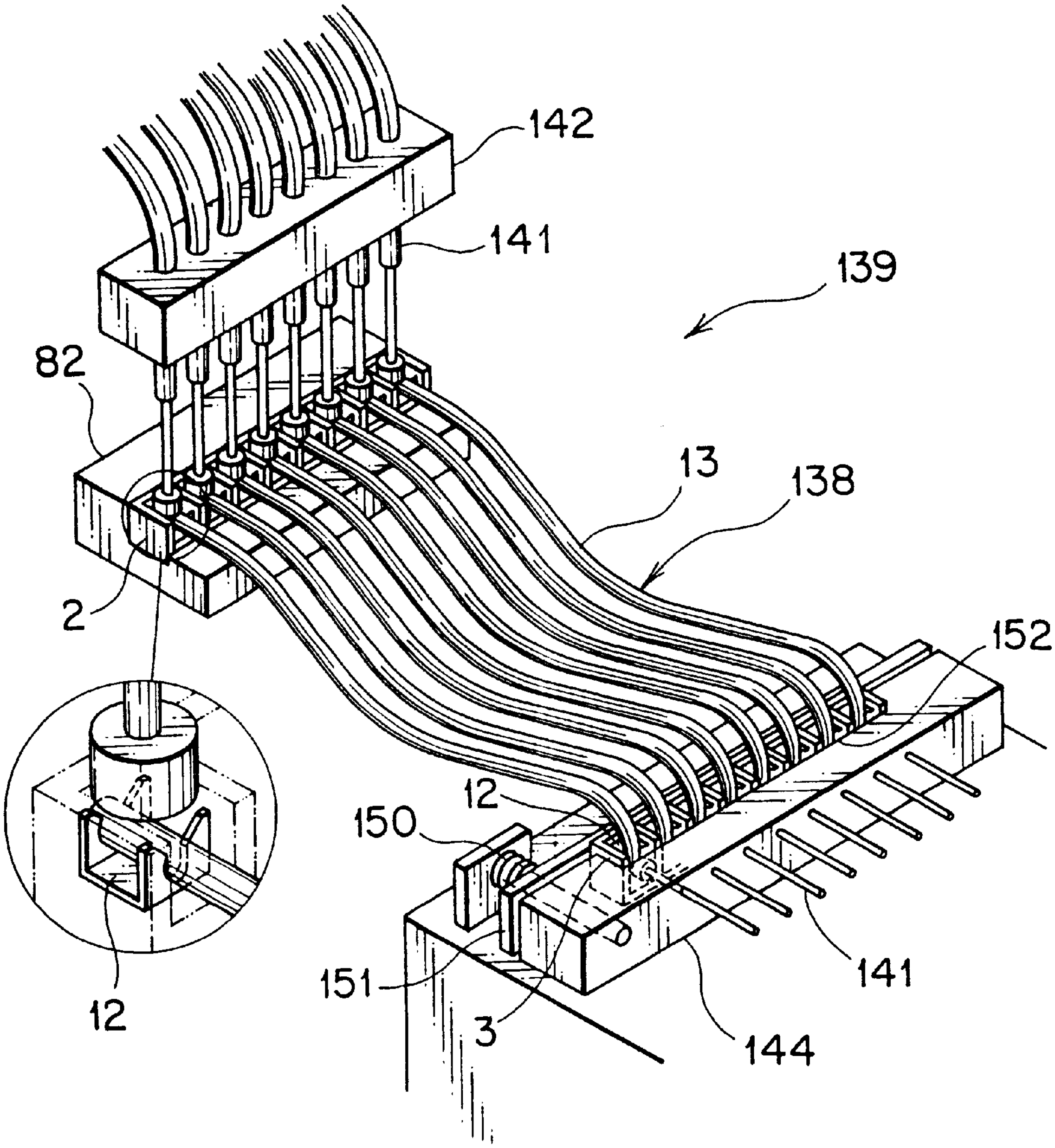
FIG. 29 is a perspective view showing the operation of a continuity test jig.
Figure 30:
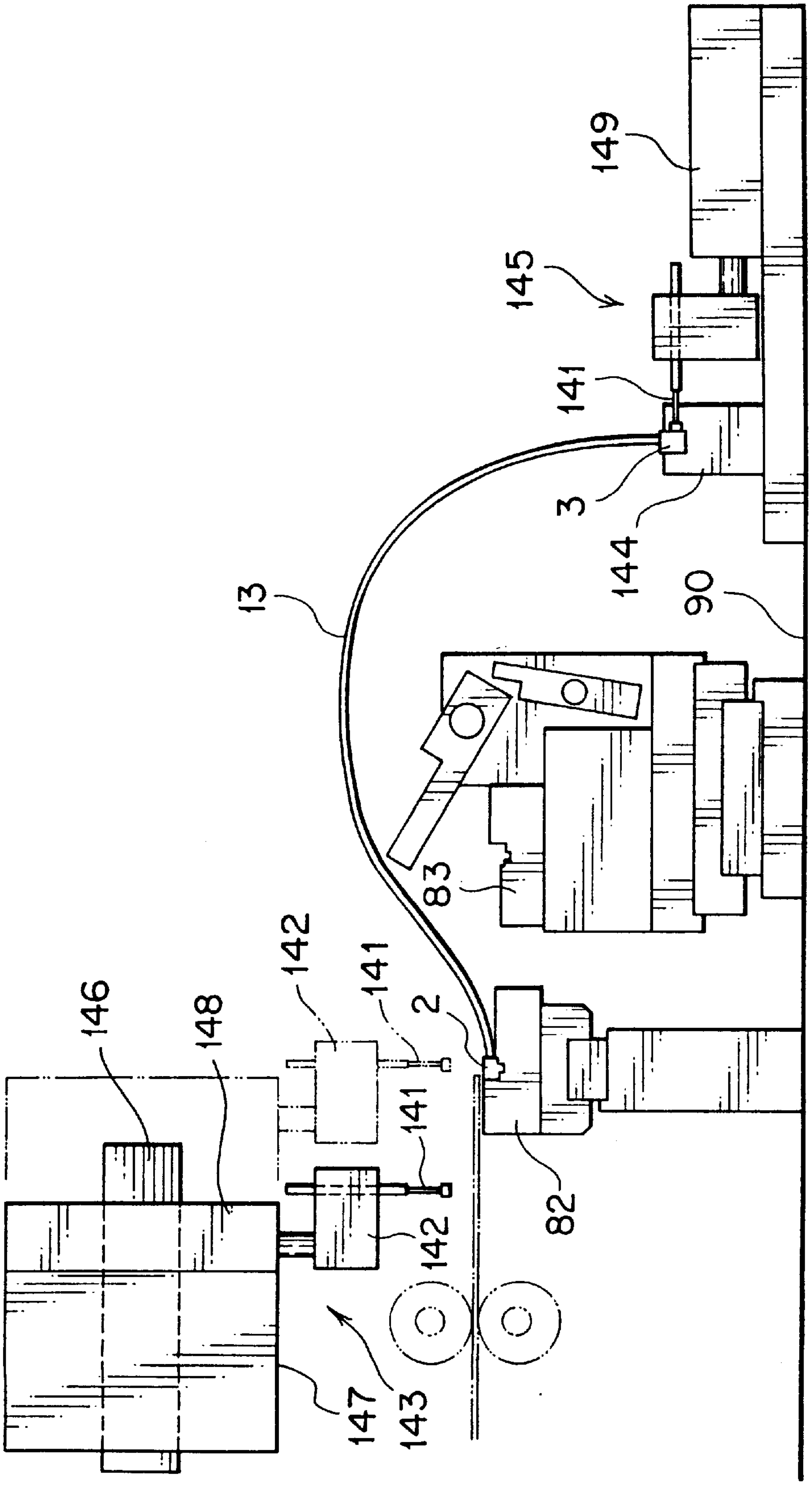
FIG. 30 is a side view of the second embodiment with the continuity test jig installed.
Figure 31:
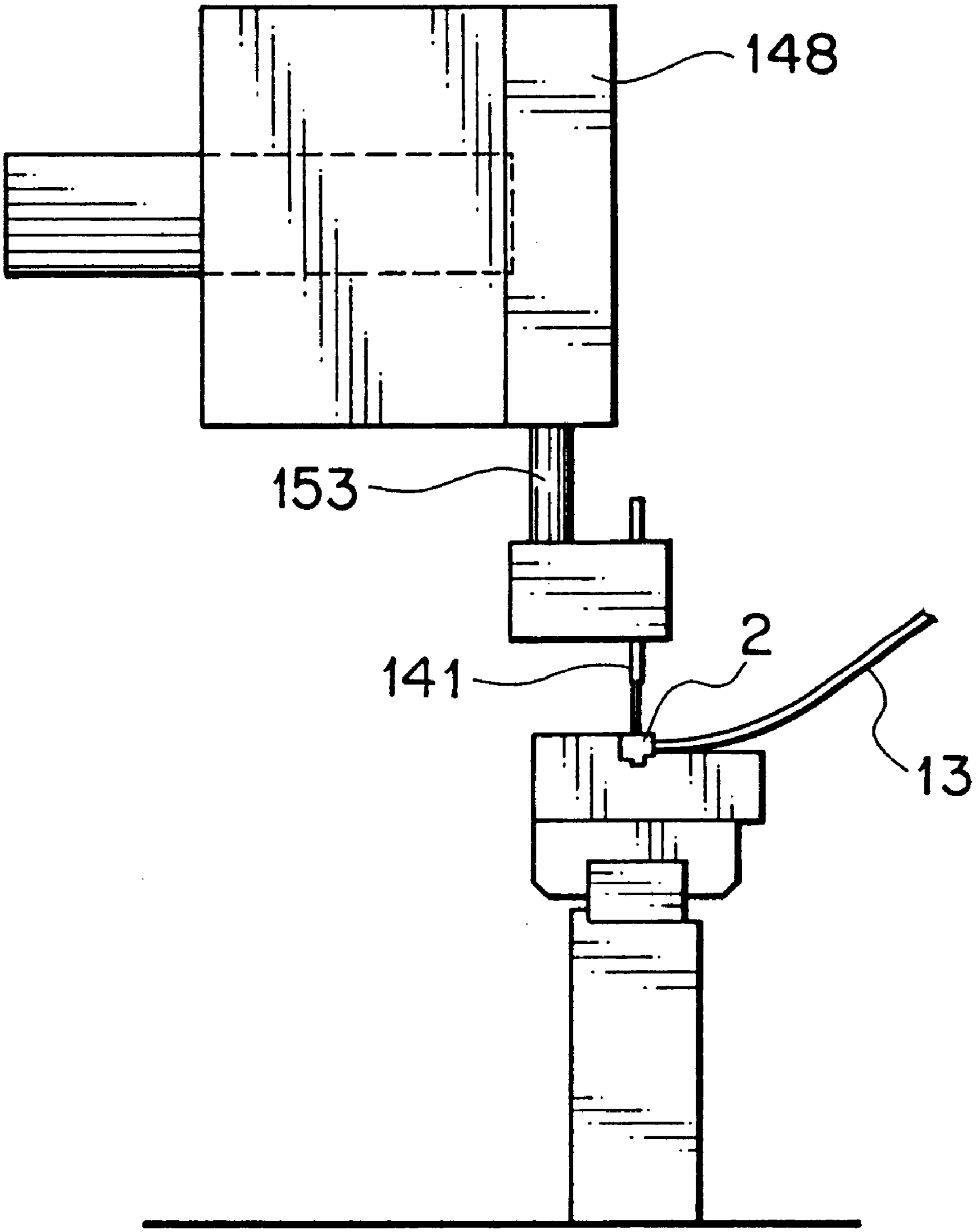
FIG. 31 is a side view of the continuity test jig when the probe pin is in contact with the terminal of the connector.
Figure 32:
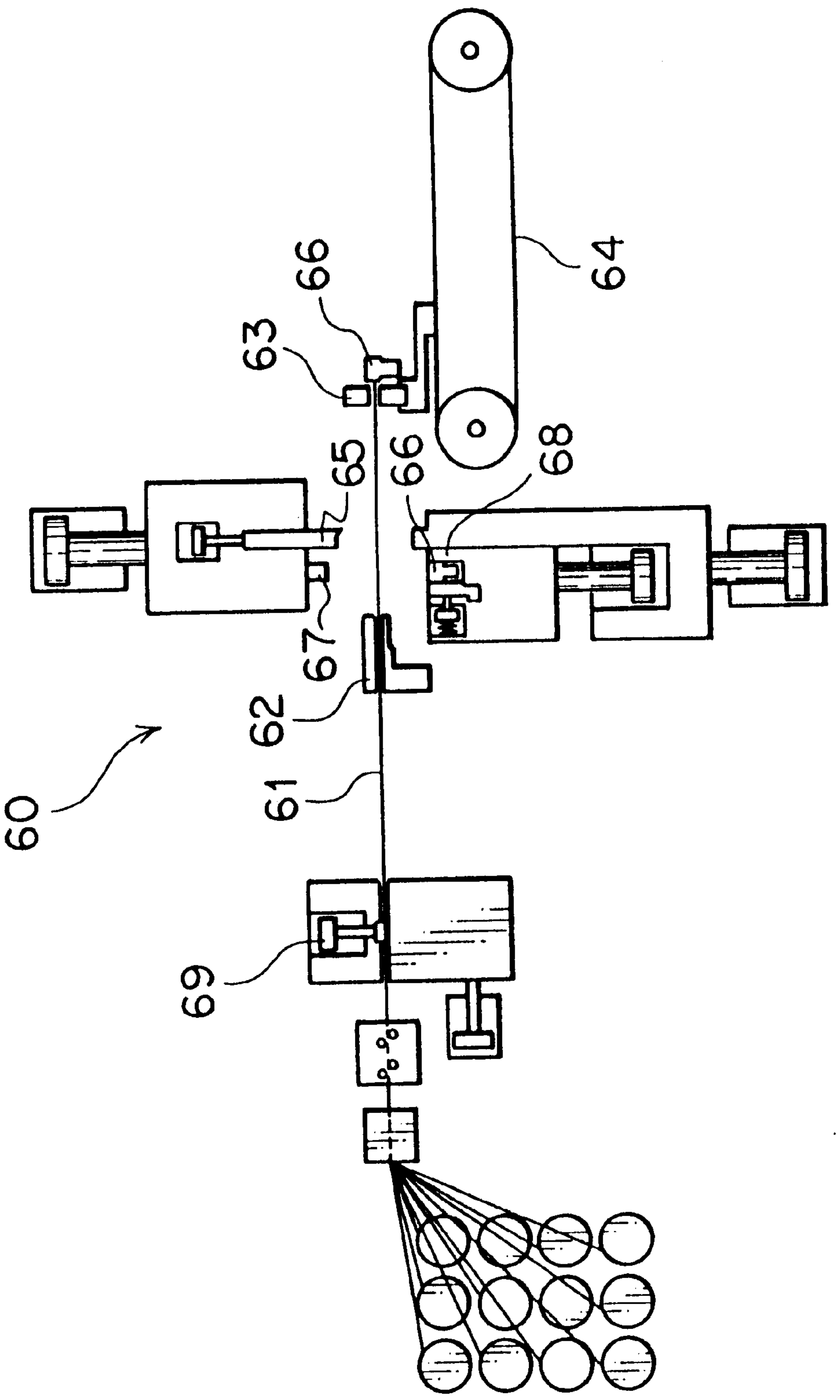
FIG. 32 PRIOR ART
FIG. 32 is a side view showing a prior art apparatus for making a wire harness with press-inserted contacts.
Figure 33:
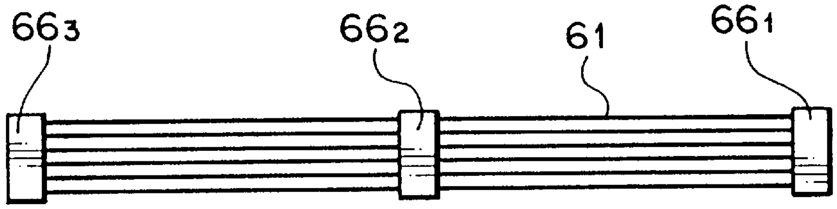
F I G. 33 PRIOR ART
FIG. 33 shows a prior art wire harness with press-inserted contacts.

FIGS. 29–31 illustrate a testing apparatus 139 and a method for continuity testing of a wire harness 138 with press-inserted contacts manufactured on the aforementioned apparatus 79.

The test apparatus 139 includes a first continuity test jig 143 (FIG. 30) and a second continuity test jig 145 (FIG. 31). The first continuity test jig 143 includes a test head 142 halving a plurality of probe pins 141 for yoke terminals 12 of the connector 2 on the first table 82 as shown in FIG. 29. The second continuity test jig 145 includes a test head 144 into which the connector automatically extracted from the second table 83 is manually inserted. The probe pins 111 each have a spring incorporated so that the probe pins are telescopically extendible.

FIG. 30 shows the first continuity test jig 143. A horizontal rail 146 is fixed to the frame. A slider 147 engages the rail 146 to move back and forth. A vertical cylinder 148 is secured to the slider 147. The test heat 142 is fixed to the tip end of the cylinder 148. The second continuity test jig 145 is fixed near the second table 83 in an area where the jig will not disturb the operation of the apparatus. The probe pins 141 are urged against the yoke terminals 12 of the connector 3 by means of the cylinder 149.

As shown in FIG. 29, the test head 144 of the second test jig 145 has a rear plate 151 movably urged against the connector 3 by a spring 150. The connector 3 is inserted from above into an opening 152 between test head 144 and the rear plate 151. The connector 3 is positioned so that the probe pins 141 are horizontally inserted into the connector 3.

After the connector 3 has been placed in position on the second test jig 145, the test head 142 of the first test jig 143 advances a position depicted by dot-dot-dash lines in FIG. 30 over the first table 82. Then, the rod 153 of the cylinder 148 extends as shown in FIG. 31 to connect the probe pins 141 to the connector 2, thereby simultaneously testing continuity between a multitude of wires 13 and yoke terminals of a press insertion harness wire 138. The testing apparatus 139 may also be used for a apparatus for making a press insertion wire harness.

What is claimed is:

1. A method of making a wire harness with press-inserted contacts, using an apparatus having first and second slide bases each of which support a connector-supporting table thereon, said first slide base is disposed downstream of said second slide base in a path in which wires are advanced, first and second press-insertion blades each of which is adapted to advance onto a connector to press-insert the wires into the connector on each connector-supporting table, a wire-supplying head movable back and forth between the tables, and wire-metering roller means disposed upstream of said tables, comprising steps of:

setting a wire-stripping machine on said slide base for the second connector, said wire-stripping machine having an upper cutting blade and a lower cutting blade;

aligning said upper cutting blade with an adapter mounted to a ram of the second press-insertion blade, said ram being adapted to retractably move toward the lower cutting blade;

advancing the wires between the upper and lower cutting blades past the blades by the wire-supplying head and then moving said upper cutting blade toward the lower cutting blade so that the cutting blades penetrate into insulators of the wires;

moving the wires rearwardly by the wire-metering roller means, thereby stripping the wires;

press-inserting end portions of the wires remote from the stripped portion into the connector supported on said first table by the first press-insertion blades.

2. The method according to claim 1, further including a step of moving the wires forwardly or rearwardly by said wire-metering roller means to meter the wires for a predetermined length.

* * * * *